United States Patent
Takagi et al.

(10) Patent No.: US 6,697,708 B2
(45) Date of Patent: Feb. 24, 2004

(54) ROBOT APPARATUS AND ROBOT APPARATUS MOTION CONTROL METHOD

(75) Inventors: Tsuyoshi Takagi, Kanagawa (JP); Kohtaro Sabe, Tokyo (JP); Takayuki Sakamoto, Kanagawa (JP); Kazufumi Oyama, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/149,825
(22) PCT Filed: Oct. 11, 2001
(86) PCT No.: PCT/JP01/08954
§ 371 (c)(1),
(2), (4) Date: Sep. 24, 2002
(87) PCT Pub. No.: WO02/30630
PCT Pub. Date: Apr. 18, 2002

(65) Prior Publication Data
US 2003/0078695 A1 Apr. 24, 2003

(30) Foreign Application Priority Data
Oct. 11, 2000 (JP) ......................... 2000-311318

(51) Int. Cl.⁷ .............................................. G06F 19/00
(52) U.S. Cl. ..................... 700/245; 700/31; 700/248; 700/258; 700/259; 318/565; 318/568.1; 318/568.11; 318/568.12; 318/568.2; 318/569; 901/1; 901/15; 901/47; 704/207; 704/209; 704/270; 348/121
(58) Field of Search .................... 700/245, 31, 259, 700/248, 258; 318/568.1, 568.2, 568.11, 568.12, 569, 16, 565; 901/1, 15, 47; 704/209, 207, 270; 348/121

(56) References Cited

U.S. PATENT DOCUMENTS 6,442,450 B1 * 8/2002 Inoue et al. ................. 700/245

FOREIGN PATENT DOCUMENTS

| JP | 64-15807 | 1/1989 |
| JP | 9-114514 | 5/1997 |
| JP | 10-15836 | 1/1998 |
| JP | 11-143849 | 5/1999 |
| JP | 2000-187502 | 7/2000 |

OTHER PUBLICATIONS

Thrun et al., Probabilistic Algorithms and the Interactive Museum Tour–guide Robot Minerva, 2000, Internet, pp. 1–35.*

Breazeal et al., Infant–like social interations between a robot and a human caregiver, 1998, Internet, pp. 1–57.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer; Bruno Polito

(57) ABSTRACT

A robot apparatus includes a command controller (101) for outputting an output command associated with an input command, management units (102), (103) and (104) for outputting data associated with the commands output by the command controller (101), a command transmitter (105) for controlling the transmission of the data output by the management units (102), (103) and (104) and controllers (106), (107) and (108) for controlling action units (109), (110) and (111), such as a motor, based on data output by the command transmitter (105). The command transmitter (105) sends the action control data for synchronization, output by the management units (102), (103) and (104), in synchroneity to the action units (109), (110) and (111).

17 Claims, 28 Drawing Sheets

| node 100 | INPUT EVENT NAME | DATA NAME | DATA RANGE | PROBABILITY OF TRANSITION TO OTHER NODES Di | | | | | n |
|---|---|---|---|---|---|---|---|---|---|
| | | | | A | B | C | D | | n |
| NODE OF DESTINATION OF TRANSITION | | | | node 120 | node 120 | node 1000 | | | node 600 |
| OUTPUT BEHAVIOR | | | | ACTION 1 | ACTION 2 | MOVE BACK | | | ACTION 4 |
| 1 | BALL | SIZE | 0.1000 | 30% | | | | | |
| 2 | PAT | | | | 40% | | | | |
| 3 | HIT | | | | 20% | | | | |
| 4 | MOTION | | | | | | | | |
| 5 | OBSTACLE | DISTANCE | 0.100 | | | 50% | | | |
| 6 | | JOY | 50.100 | | | 100% | | | |
| 7 | | SUPRISE | 50.100 | | | | | | |
| 8 | | SADNESS | 50.100 | | | | | | |

ROBOT APPARATUS AND ROBOT APPARATUS MOTION CONTROL METHOD

TECHNICAL FIELD

This invention relates to a robot apparatus and method for controlling its actions. More particularly, it relates to a robot apparatus having plural action means and a method for controlling its actions.

BACKGROUND ART

In recent years, a robot apparatus formed after the appearance of an animal, such as a dog, is being presented to the market. This robot apparatus acts like an animal, responsive to the information from outside or to its own internal state, such as its feeling state.

Meanwhile, in this type of the robot apparatus, its action parts can be activated independently of one another. Thus, if the plural action parts are to be activated synchronously, synchronized control is required for the robot apparatus. For example, in certain robot apparatus, the movement of eyes, formed by LEDs, and the speech output by e.g., a loudspeaker, can be executed synchronously as the posture of the robot apparatus is progressively changed by controlling respective joints. In such case, the various action parts must be controlled synchronously.

In such synchronous control of respective action parts, synchroneity must be set as from the timing the synchronized actions are started, while synchroneity must continue to be set during the actions.

The reason is that, if the control synchroneity falls into disorder, the actions by the respective action parts occur irrelevantly without harmony.

DISCLOSURE OF THE INVENTION

The present invention has been made in view of the above-described status of the related art, and is aimed to provide a robot apparatus in which plural action parts can be synchronized accurately and efficiently, and a method for controlling the actions of such robot apparatus.

For accomplishing the above object, the present invention provides a robot apparatus including a plurality of action means for performing actions, and control means for controlling the actions of the plural action means. The control means causes the plural action means to perform actions in synchronization with each other in succession to a preceding action performed by the action means.

This robot apparatus performs synchronous actions in succession without delay following the completion of the previous actions.

For accomplishing the above object, the present invention also provides an action control method for the robot apparatus wherein the synchronous actions by the plural action means are carried out as temporally late actions in succession to a preceding action performed by the action means.

By this action control method of the robot apparatus, the robot apparatus is able to performs synchronous actions in succession without delay following the completion of the previous actions.

For accomplishing the above object, the present invention also provides a robot apparatus including a plurality of action performing means for performing actions, and a plurality of action control means for controlling the action performing means, in which the robot apparatus further includes command control means for outputting a plurality of synchronization commands relevant to action performing commands for causing the robot apparatus to perform preset actions, and command transmission control means for controlling the synchronization commands output by the command control means to send the synchronization commands to the plural action control means. The command control means affords a label indicating at least the IDs of the synchronization commands to be synchronized and the total number of the synchronization commands to be synchronized to each of the plural synchronization commands to output the synchronization commands. The command transmission control means sends the plural synchronization commands in synchroneity based on the IDs and the total number.

This robot apparatus performs synchronous actions in succession without delay following the completion of the previous actions.

For accomplishing the above object, the present invention also provides a method for controlling the actions of a robot apparatus including a plurality of action performing means for performing actions, and a plurality of action control means for controlling the plural action performing means, in which the method includes a step of command control means affording a label indicating at least the IDs of the synchronization commands to be synchronized and the total number of the synchronization commands to be synchronized to each of plural synchronization commands relevant to the action performing commands which cause the robot apparatus to perform preset actions. The synchronization commands output by the command control means are controlled by command transmission control means to cause the plural synchronization commands to be synchronized based on the IDs and the total number to send the synchronization commands to the plural action control means.

By this action control method for the robot apparatus, the robot apparatus performs synchronous actions in succession without delay following the completion of the previous actions.

For accomplishing the above object, the present invention also provides a robot apparatus including a plurality of action performing means for performing actions and a plurality of action control means for controlling the actions of the plural action performing means, in which the robot apparatus further includes command control means for outputting a plurality of synchronization commands relevant to action performing commands for performing preset actions of the robot apparatus, a plurality of buses over which the action performing commands are transmitted, a plurality of command transmission control means provided for each of the buses for controlling the synchronization commands output by the command control means and for transmitting the synchronization commands to the plural action control means, and a co-owned memory that can be accessed by the plural command transmission control means. The command control means affords a label at least indicating the IDs of the synchronization commands to be synchronized and the total number of the synchronization commands to be synchronized to each of the plural synchronization commands, and outputs the synchronization command. The command transmission control means causes the IDs and the total number to be stored in the co-owned memory and references the co-owned memory to synchronize the plural synchronization commands to send the synchronized synchronization commands to the action control means over the buses.

This robot apparatus performs synchronous actions in succession without delay following the completion of the previous actions.

For accomplishing the above object, the present invention also provides a method for controlling the actions of a robot apparatus including a plurality of action performing means for performing actions, and a plurality of action control means for controlling the actions of the plural action performing means, in which the method includes a step of command control means affording a label indicating at least the IDs of the synchronization commands to be synchronized and the total number of the synchronization commands to be synchronized to each of the plural synchronization commands relevant to the action performing commands which cause the robot apparatus to perform preset actions. On each of plural buses used for transmitting the commands, there is provided command transmission control means for controlling the synchronization commands output by the command control means to cause the IDs and the total number to be stored in the co-owned memory. The command transmission control means references the co-owned memory to synchronize the synchronization commands that can be accessed by the plural command transmission control means to transmit the synchronization commands to the plural command transmission control means over the buses.

By this action control method for the robot apparatus, the robot apparatus performs synchronous actions in succession without delay following the completion of the previous actions.

Other objects, features and advantages of the present invention will become more apparent from reading the embodiments of the present invention as shown in the drawings.

BRIEF DESCRIPTION OF THE DRAWINGS

FIG. 8 shows a status transition table provided for each node of the finite probability automaton.

BEST MODE FOR CARRYING OUT THE INVENTION

Figure 1:
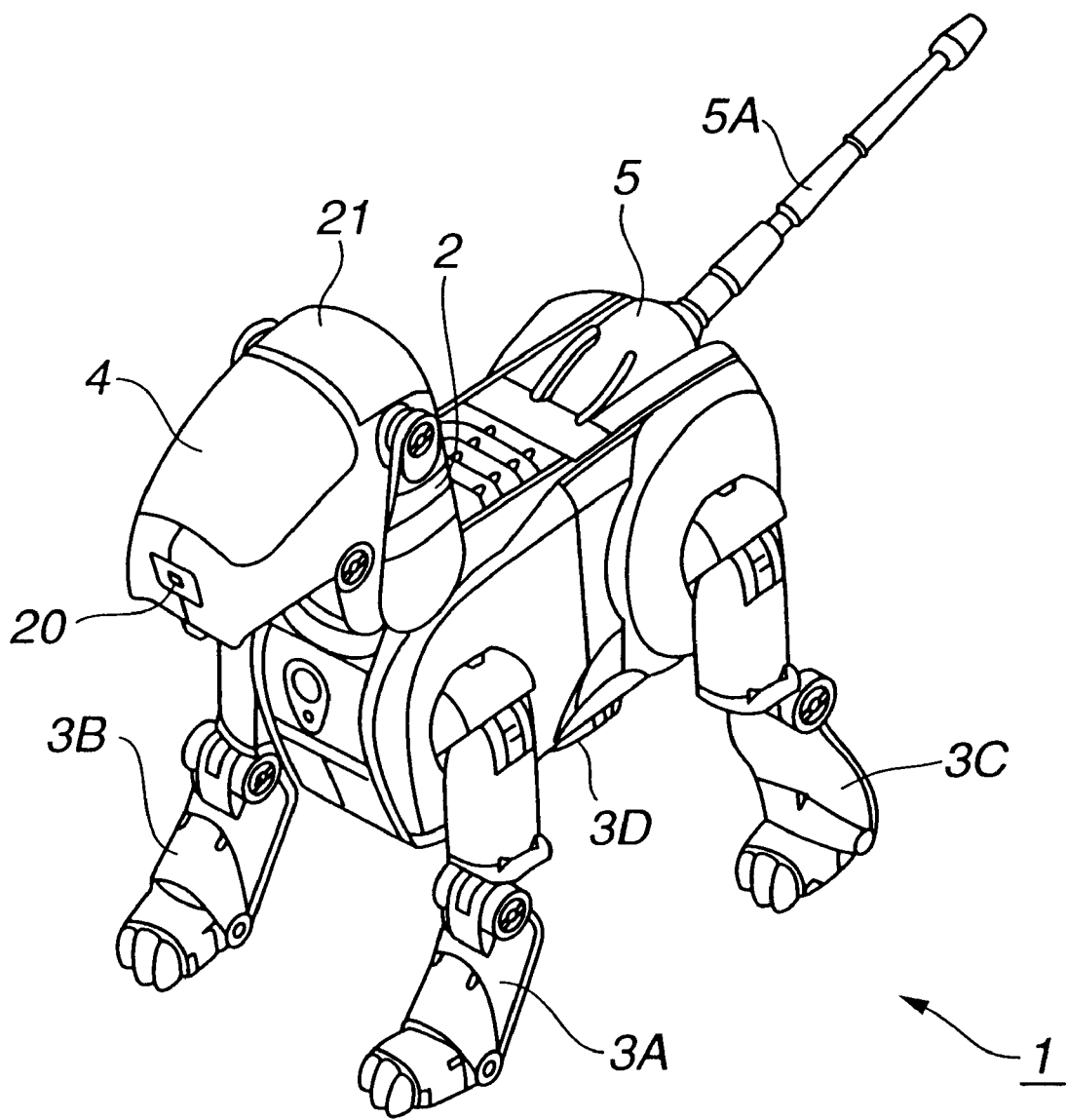
FIG. 1 is a perspective view showing the appearance of a robot apparatus embodying the present invention.

Referring to the drawings, a preferred embodiment of the present invention is explained in detail. This embodiment is directed to an autonomous robot apparatus which behaves autonomously responsive to surrounding environments (external factor) and to internal states (internal factor).

In the present embodiment, the structure of the robot apparatus is first explained and subsequently the diary function exploiting the robot apparatus is explained in detail.

(1) Structure of Robot Apparatus of the Present Embodiment

As shown in FIG. 1, the robot apparatus is a so-called pet robot, simulating an animal, such as a 'dog', and is constructed by leg units 3A, 3B, 3C and 3D, connected on the front and rear sides on the left and right sides of a trunk unit 2, and by a head unit 4 and a tail unit 5, connected to the front and rear ends of the trunk unit 2, respectively.

Figure 2:
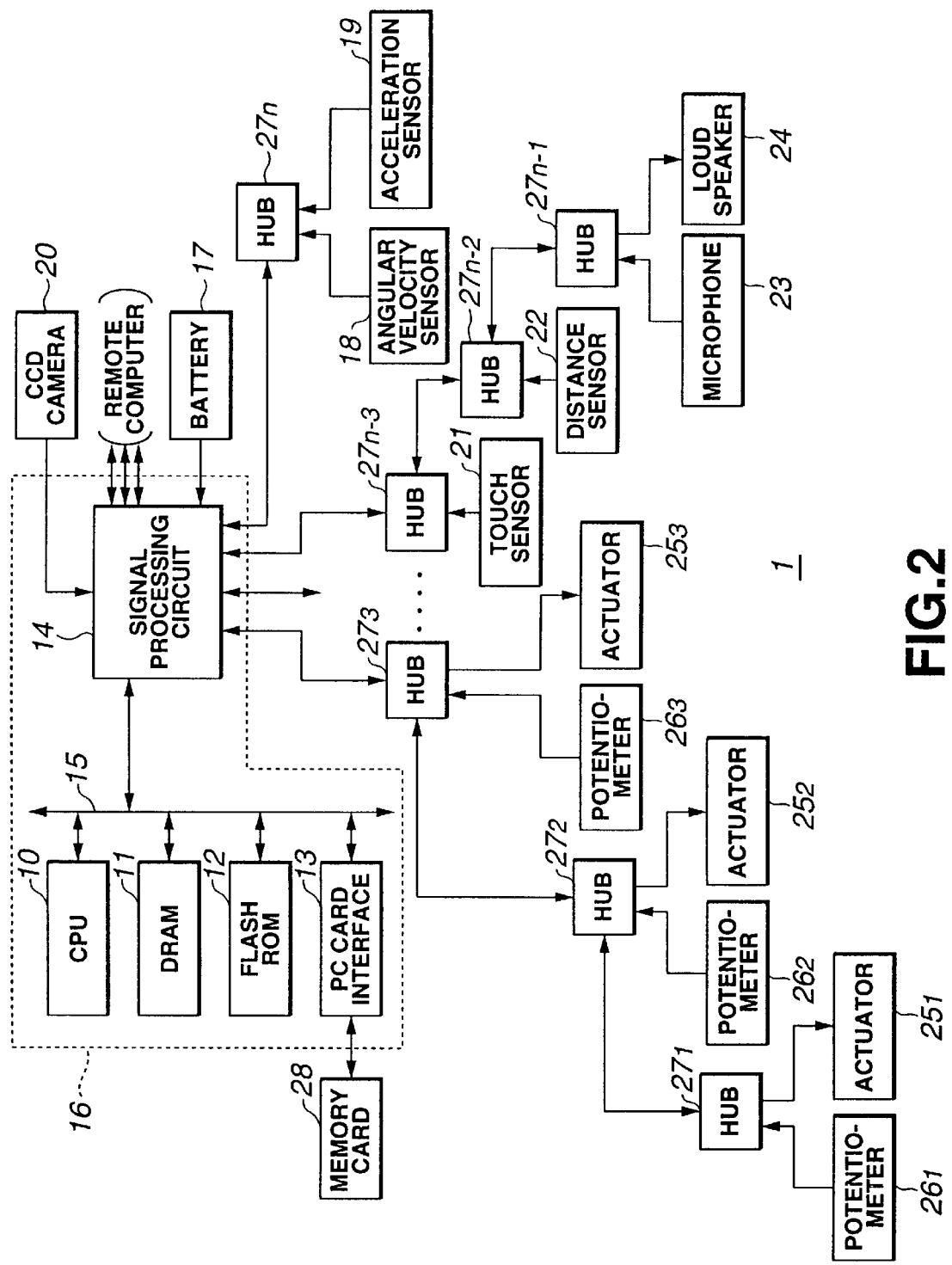
FIG. 2 is a block diagram showing a circuit structure of the robot apparatus.

Referring to FIG. 2, the trunk unit 2 includes a controller unit 16, comprised of an interconnection over an internal bus 15 of a CPU (central processing unit) 10, a DRAM (dynamic random access memory) 11, a flash ROM (read-only memory) 12, a PC (personal computer) card interface circuit 13 and a signal processing circuit 14, and a battery 17 as a power supply for the robot apparatus 1. In the trunk unit 2 are also housed an angular velocity sensor 18 and an acceleration sensor 19 for detecting the posture and the acceleration of movement of the robot apparatus 1.

On the head unit 4, there are mounted, in position, a CCD (charge coupled device) camera 20 for imaging an outside state, a touch sensor 21, for detecting the pressure resulting from a physical action, such as 'stroking' or 'patting' from the user, a distance sensor 22 for measuring the distance to an object positioned ahead, a microphone 23 for collecting the external sound, a loudspeaker 24 for outputting the sound, like whining, and LEDs (light emitting diodes) equivalent to the 'eyes' of the robot apparatus 1.

The joint portions of the leg units 3A to 3D, connecting portions of the leg units 3A to 3D and the trunk unit 2, connecting portions of the head unit 4 and the trunk unit 2 and the connecting portion of a tail 5A of the tail unit 5 are provided with a number of actuators $25_1$ to $25_n$ and potentiometers $26_1$ to $26_n$ corresponding to the number of the degrees of freedom. For example, the actuators $25_1$ to $25_n$ include servo motors. The leg units 3A to 3D are controlled by the driving of the servo motors to transfer to a targeted posture or movement.

The sensors, such as the angular velocity sensor 18, acceleration sensor 19, touch sensor 21, floor contact sensors 23R/L, posture sensor 24, distance sensor 25, microphone 26, distance sensor 22, microphone 23, loudspeaker 24 and the potentiometers $25_1$ to $25_n$ are connected via associated hubs $27_1$ to $27_n$ to the signal processing circuit 14 of the controller 16, while the imaging device 20 and the battery 17 are connected directly to the signal processing circuit 14.

The signal processing circuit 14 sequentially captures sensor data, picture data or speech data, furnished from the above-mentioned respective sensors, to cause the data to be sequentially stored over internal bus 15 in preset locations in the DRAM 11. In addition, the signal processing circuit 14 sequentially captures residual battery capacity data indicating the residual battery capacity supplied from the battery 17 to store the data thus captured in preset locations in the DRAM 11.

The respective sensor data, picture data, speech data and the residual battery capacity data, thus stored in the DRAM 11, are subsequently utilized when the CPU 10 performs actional control of the robot apparatus 1.

In actuality, in an initial stage of power up of the robot apparatus 1, the CPU 10 reads out a memory card 28 loaded in a PC card slot, not shown, of the trunk unit 2, or a control program stored in the flash ROM 12, either directly or through a PC card interface circuit 13, for storage in the DRAM 11.

The CPU 10 then checks its own status and surrounding statuses, and the possible presence of commands or actions from the user, based on the sensor data, picture data, speech data or residual battery capacity data, sequentially stored from the signal processing circuit 14 to the DRAM 11.

The CPU 10 also determines the next ensuing actions, based on the verified results and on the control program stored in the DRAM 11, while driving the actuators $25_1$ to $25_n$, as necessary, based on the so determined results, to produce behaviors, such as swinging the head unit 4 in the up-and-down direction or in the left-and-right direction, or moving the leg units 3A to 3D for walking or jumping.

The CPU 10 generates speech data as necessary and sends the so generated data through the signal processing circuit 14 as speech signals to the loudspeaker 24 to output the speech derived from the speech signals to outside or turns on/off or flicker the LEDs.

In this manner, the present robot apparatus 1 is able to behave autonomously responsive to its own status and surrounding statuses, or to commands or actions from the user.

(2) Software Structure of Control Program

Figure 3:
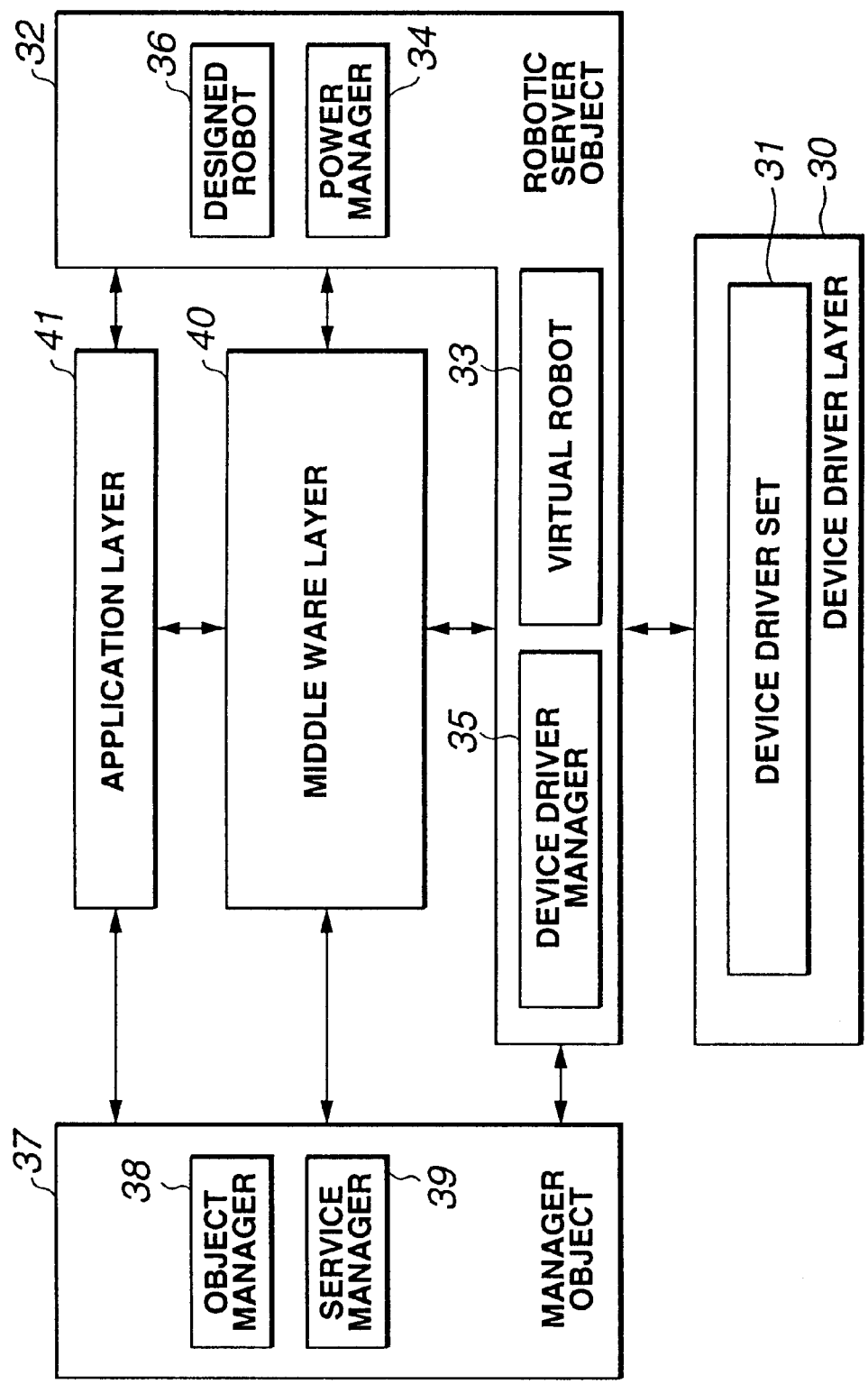
FIG. 3 is a block diagram showing a software structure of the robot apparatus.

FIG. 3 shows the software structure of the above-mentioned control program in the robot apparatus 1. In FIG. 3, a device driver layer 30 is positioned in the lowermost layer of the control program, and is formed as a device driver set 31 made up by plural device drivers. Each device driver is an object allowed to directly access the hardware used in a routine computer, such as an image pickup device 20 (FIG. 2) or a timer, and performs processing responsive to interruption from an associated hardware.

A robotics server object 32 is made up by a virtual robot 33, a power manager 34, comprised of a set of software items responsible for switching between power sources, a device driver manager 35, comprised of a set of software items, supervising various other device drivers, and a designed robot 36, comprised of a set of software items supervising the mechanism of the robot apparatus 1. The virtual robot 33, located in the lowermost layer of the device driver layer 30, is comprised of a set of software items furnishing an interface for accessing the hardware items, including the above-mentioned various sensors and actuators $25_1$ to $25_n$.

A manager object 37 is made up by an object manager 38 and a service manager 39. The object manager 38 is a set of software items supervising the booting and the end of respective software items included in the robotics server object 32, a middle ware layer 40 and an application layer 41, while the service manager 39 is a set of software items supervising the connection to respective objects based on the information on the connection among respective objects stated in a connection file stored in a memory card 28 (FIG. 2).

The middle ware layer 40 is positioned as an upper layer of the robotics server object 32, and is made up by a set of software items providing basic functions of the robot apparatus 1, such as picture processing or speech processing. The application layer 41 is located as an upper layer of the middle ware layer 40, and is a set of software items for deciding on the behavior of the robot apparatus 1 based on the results of the processing by the software items making up the middle ware layer 40.

Figure 4:
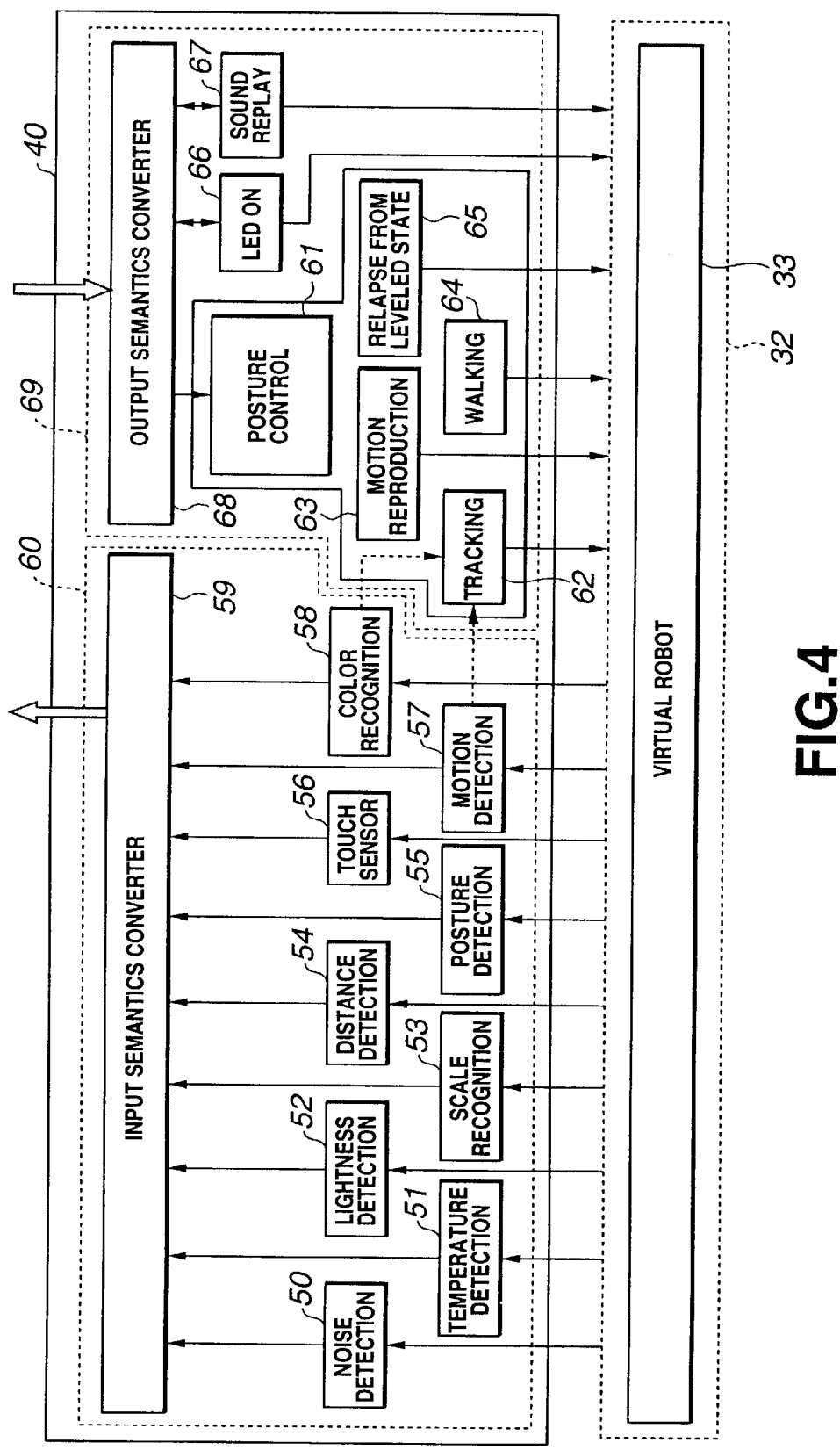
FIG. 4 is a block diagram showing an application layer in the software structure of the robot apparatus.

FIG. 4 shows specified software structures of the middle ware layer 40 and the application layer 41.

Referring to FIG. 4, the middle ware layer 40 is made up by a recognition system 60, having signal processing modules 50 to 58 for noise-, temperature- or lightness detection, sound scale recognition, distance- or posture detection, for a touch sensor, for motion detection and for color recognition, and an input semantics converter module 68, and by an outputting system 69, having an output semantics converter module 68 and signal processing modules 61 to 67 for posture management, tracking, motion reproduction, walking, restoration from the falldown state, LED lighting and for sound reproduction.

The signal processing modules 50 to 58 of the recognition system 60 captures relevant data from the sensor data, picture data and the speech data, read out by the virtual robot 33 of the robotics server object 32 from the DRAM 11 (FIG. 2) to process the data and routes the processed results to the input semantics converter module 59. It is noted that the virtual robot 33 is constructed as a component for exchanging or converting signals in accordance with a preset communication protocol.

The input semantics converter module 59 recognizes the own status, the surrounding status, user's commands or actions, such as 'annoying', 'sultry', 'light', 'a ball has been detected', 'falldown is detected', 'stroked', 'patted', 'do-mi-so scale has been heard', 'a moving object has been detected', or 'an obstacle has been detected' to output the results of recognition to the application layer 41 (FIG. 3).

Figure 5:
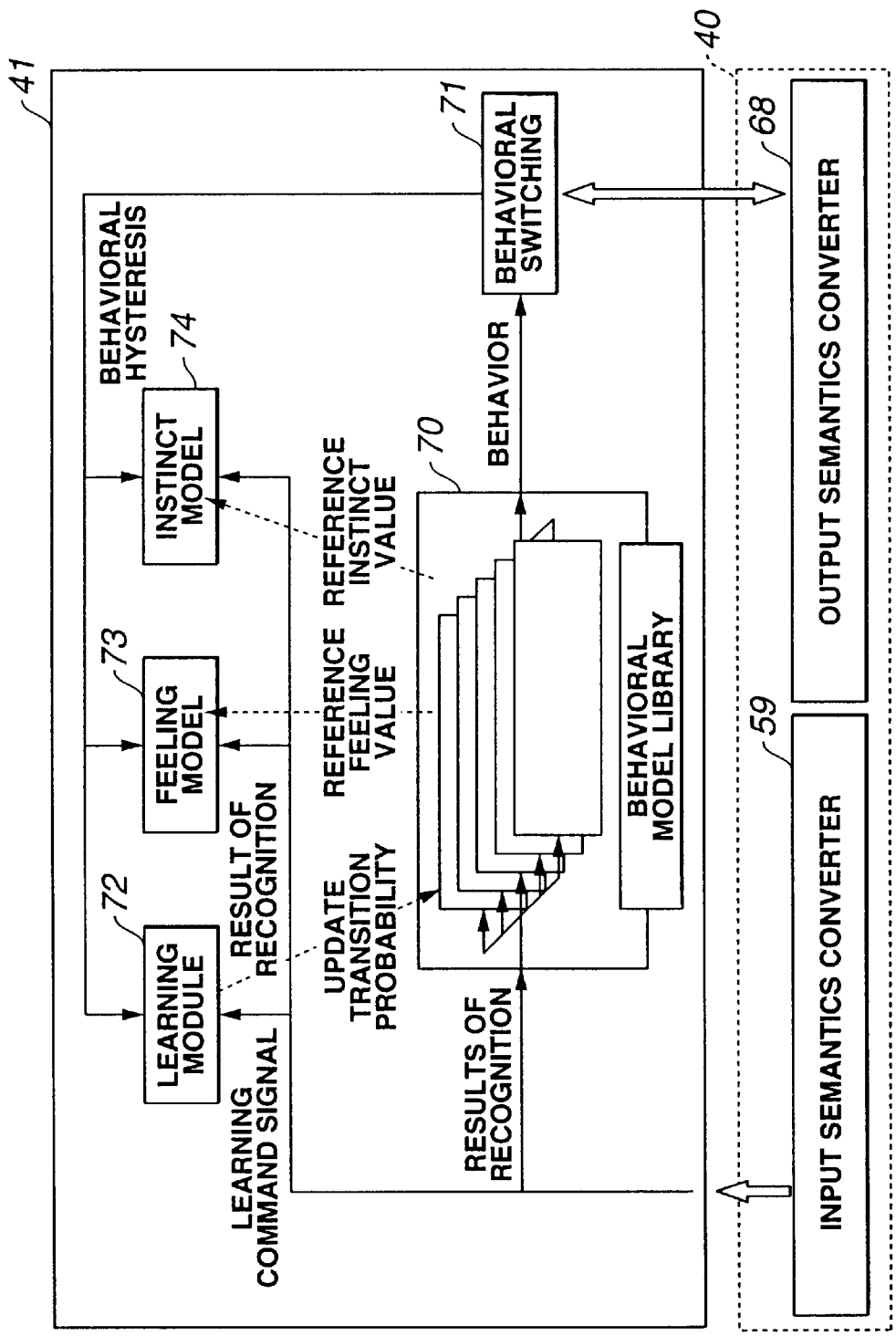
FIG. 5 is a block diagram showing the structure of an application layer in the software structure of the robot apparatus.

The application layer 41 is made up by five modules, namely a behavioral model library 70, a behavioral switching module 71, a learning module 72, a feeling model 73 and an instinct model 74, as shown in FIG. 5.

Figure 6:
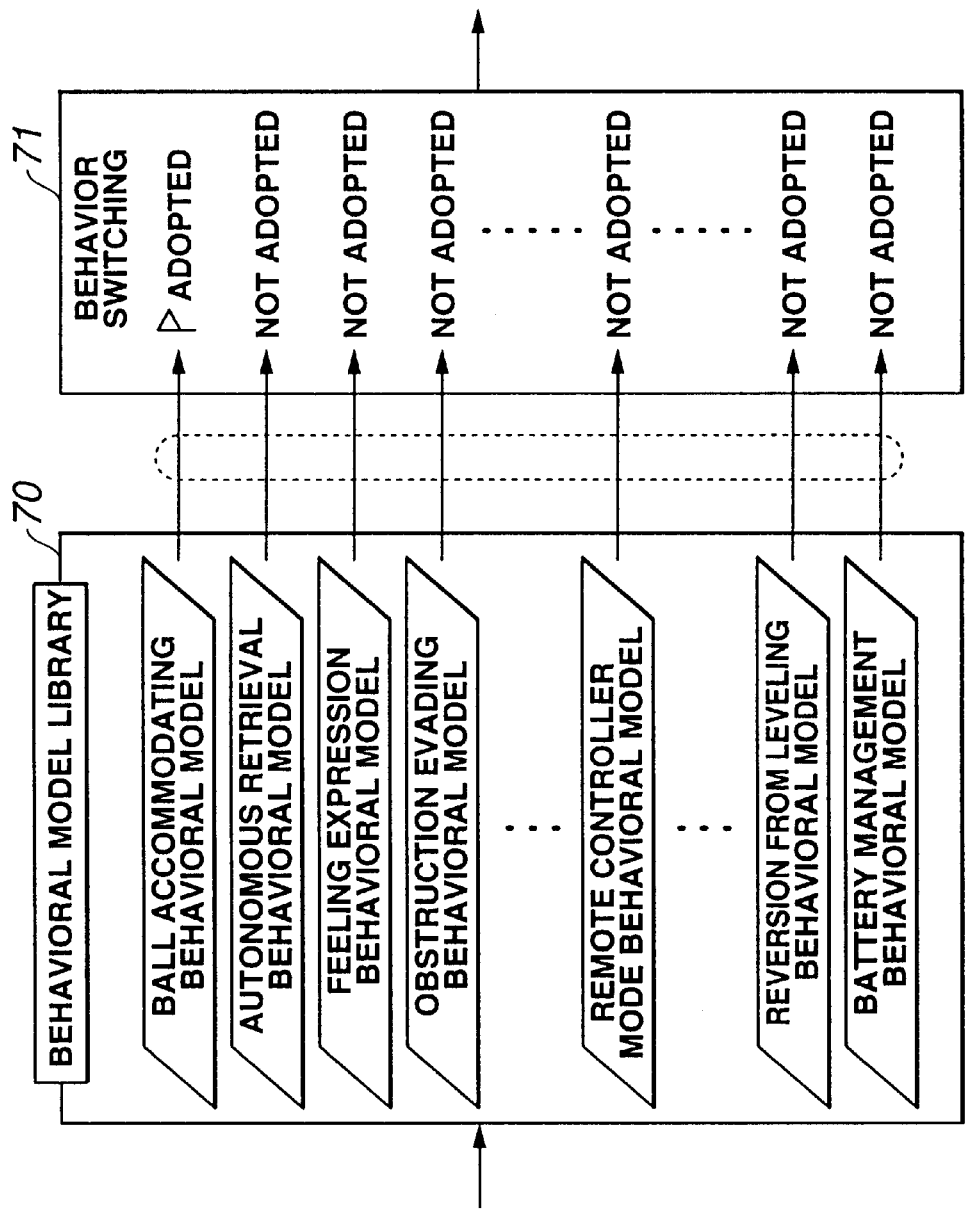
FIG. 6 is a block diagram showing the structure of a behavioral model library of the application layer.
Figure 7:
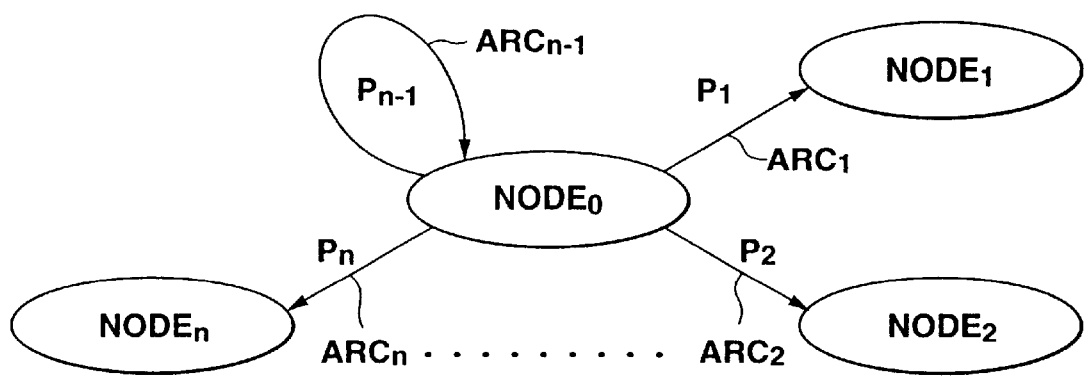
FIG. 7 illustrates a finite probability automaton as the information for behavior decision for the robot apparatus.

In the behavioral model library 70 there are provided respective independent behavioral models $70_1$ to $70_n$ in association with plural pre-selected condition items, such as 'residual battery capacity is small', 'restoration from the falldown state', 'an obstacle is to be evaded', 'the feeling is to be expressed' or 'a ball has been detected', as shown in FIG. 6.

When the results of recognition are provided from the input semantics converter module 59 or a preset time has elapsed as from the time the last results of recognition were provided, the behavioral models $70_1$ to $70_n$ decide on the next behaviors, as they refer to parameter values of the emotion as held by the feeling model 73 and to parameter values of the corresponding desires as held by the instinct model 74, to send the results of decision to the behavioral switching module 71.

In the present embodiment, the behavioral models $70_1$ to $70_n$ use an algorithm, termed finite probability automaton, as a technique of deciding on the next behavior. This algorithm probabilistically determines from which one of the nodes (states) $NODE_0$ to $NODE_n$ to which one of these nodes $NODE_0$ to $NODE_n$ transition is to be made, based on the values of the transition probability $P_1$ to $P_n$ as set for the arcs $ARC_1$ to $ARC_{n1}$ interconnecting the respective nodes $NODE_0$ to $NODE_n$.

Specifically, each of the behavioral models $70_1$ to $70_n$ includes a status transition table 80, shown in FIG. 8, for each of the nodes $NODE_0$ to $NODE_n$, forming the own behavioral models $70_1$ to $70_n$, in association with these nodes $NODE_0$ to $NODE_n$.

In the status transition table 80, input events (results of recognition), as the conditions for transition in the nodes $NODE_0$ to $NODE_n$, are listed in the column of the 'input event name', in the priority order, and further conditions for the transition condition are stated in associated rows of the columns 'data name' and 'data range'.

Thus, in the node $NODE_{100}$, shown in the status transition table 80 of FIG. 8, given the results of recognition 'ball has been detected' (BALL), the ball size (SIZE) being 'from 0 to 1000', as given along with the results of recognition, represents a condition for transition to another node. Similarly, given the results of recognition 'an obstacle has been detected' (OBSTACLE), the distance (DISTANCE) to the obstacle being in a range 'from 0 to 100', as given along with the results of recognition, represents a condition for transition to another node.

Also, in the present node $NODE_{100}$, if no results of recognition are input, but any one of the parameter values 'joy' (JOY), surprise (SURPRISE) or 'sadness' (SADNESS) among the parameter values of the respective emotion and desires, as held in the feeling model 73, among the parameter values periodically referenced by the behavioral models $70_1$ to $70_n$, is in a range between '50 and 100', transition may be made to another node.

Moreover, in the status transition table 80, the node names to which transition can be made from the node $NODE_0$ to $NODE_n$ are shown in the row 'nodes of destination of transition' in the column 'probability of transition to other nodes'. Additionally, the probability of the transition to other nodes $NODE_0$ to $NODE_n$, enabled when all conditions stated in the columns 'input event name', 'data name' and 'data range' are met, is entered in corresponding locations in the column 'probability of transition to other nodes'. The behaviors to be output on the occasion of transition to the nodes $NODE_0$ to $NODE_n$ are indicated in the row 'output behavior' in the column 'probability of transition to other nodes'. Meanwhile, the sum of the probability values of each row in the column 'probability of transition to other nodes' is 100%.

Thus, in the node $NODE_{100}$ represented by the status transition table 80 of FIG. 8, given the results of recognition that 'the ball has been detected' and that the size (SIZE) of the ball is in a range from '0 to 1000', transition to the 'node $NODE_{120}$ (node 120)' can be made with the probability of 30%, and the behavior 'ACTION 1' is then output.

In each of the behavioral models $70_1$ to $70_n$, a plural number of the sets of the nodes $NODE_0$ to $NODE_n$, each stated as this status transition table 80, are concatenated together, such that, given the results of recognition from the input semantics converter module 59, the next behavior is probabilistically determined by exploiting the status transition tables of the $NODE_0$ to $NODE_n$ and the results of the decision are output to the behavioral switching module 71.

The behavioral switching module 71, shown in FIG. 5, sends to the output semantics converter module 68 of the middle ware layer 40 a command to select the behavior output from one of the behavioral models $70_1$ to $70_n$, having a preset high priority order, among the behaviors output from the respective behavioral models $70_1$ to $70_n$ of the behavioral model library 70, and to execute the behavior. This command is referred to below as a behavioral command. In the present embodiment, the order of priority of a given one of the behavioral models $70_1$ to $70_n$ shown in FIG. 6 is the higher the lower the rank of the behavioral model in question in FIG. 6.

The behavioral switching module 71 notifies the learning module 72, feeling model 73 and the instinct model 74 of the effect of the termination of the behavior, based on the behavior completion information afforded from the output semantics converter module 68 after the end of the behavior.

The learning module 72 is fed with the results of recognition of the instructions received as an action from a user, such as 'patting' or 'stroking', from among the results of recognition provided from the output semantics converter module 68.

The learning module 72 changes the probability of transition of the behavioral models $70_1$ to $70_n$ in the behavioral model library 70, based on the results of recognition and on the notification from the behavioral switching module 71, such that, when the action is 'patting' ('scolding') or 'stroking' ('praising'), the probability of occurrence of the behavior in question will be increased or decreased, respectively.

On the other hand, the feeling model 73 is holding parameters representing the intensity of each of the six emotion types, namely joy (JOY), sadness (SADNESS), anger (ANGER), surprise (SURPRISE), disgust (DISGUST) and fear (FEAR). The feeling model 73 periodically updates the parameter values of these emotion types, based on the particular results of recognition provided by the input semantics converter module 59, such as 'patted' or 'stroked', time elapsed and on the notification from the behavioral switching module 71.

Specifically, the feeling model 73 calculates a parameter value E[t+1] of the current emotion type for the next period in accordance with the following equation (1):

$$E[t+1]=E[t]+ke \times \Delta E[t] \qquad (1)$$

where ΔE[t] in the amount of variation of the emotion type as calculated by a preset equation based on, for example, the results of recognition provided by the input semantics converter module 59, the behavior of the robot apparatus 1 at the pertinent time or on the time elapsed as from the previous updating event, E[t] is the current parameter value of the emotional type and ke is a coefficient representing the sensitivity of the emotion type. The feeling model 73 substitutes the so calculated value for the current parameter value E[t] of the emotion type to update the parameter value of the emotion type. In similar manner, the feeling model 73 updates the parameter values of the totality of the emotion types.

Which effect the respective results of recognition and the notification from the output semantics converter module 68 will have on the variation of the parameter values of the respective emotion types ΔE[t] is predetermined, such that the results of recognition 'patted' significantly affects the amount of variation ΔE[t] of the parameter value of the emotion type 'anger', while the results of recognition 'patted' significantly affects the amount of variation ΔE[t] of the parameter value of the emotion type 'joy'.

The notification from the output semantics converter module 68 is the so-called behavior feedback information (behavior end information) and the information concerning the results of occurrence of the behavior. The feeling model 73 also changes the feeling based on this information. For example, the feeling level of anger may be lowered by the act of 'barking'. Meanwhile, the notification from the output semantics converter module 68 is also input to the learning module 72, which then changes the corresponding transition probability of the behavioral models 70₁ to 70ₙ based on this notification.

Meanwhile, the feedback of the results of the behavior may be made by an output of the behavioral switching module 71 (behavior seasoned with the feeling).

On the other hand, the instinct model 74 holds the parameters, representing the intensity of five reciprocally independent desires, namely 'desire for exercise' 'desire for affection', 'appetite' and 'curiosity'. The instinct model 74 periodically updates the parameter values of these desires, based on the results of recognition provided from the input semantics converter module 59, time elapsed and on the notification from the behavioral switching module 71.

Specifically, as concerns the 'desire for exercise', 'desire for affection' and 'curiosity', the instinct model 74 calculates, at a preset period, the parameter value I [k+1] of these desires at the next period, using the following equation (2):

$$I[k+1]=I[k]+ki \times \Delta I[k] \qquad (2)$$

where ΔI[k] is the amount of variation of the desire in question at a pertinent time as calculated by a preset equation based on the results of recognition, time elapsed and the notification of the output semantics converter module 68, I[k] is the current parameter value of the desire and ki is the coefficient representing the sensitivity of the desire in question, and substitutes the calculated results for the current parameter value I[k] to update the parameter value of the desire. The instinct model 74 updates the parameter values of the respective desires except the 'appetite'.

The effect of the results of recognition and the notification from the output semantics converter module 68 on the amount of variation ΔI[k] of the parameter values of the respective desires is predetermined, such that, for example, the notification from the output semantics converter module 68 significantly affects the amount of variation ΔI[k] of the parameter values of 'fatigue'.

In the present embodiment, the parameters of the respective emotion types and the respective desires (instincts) are varied in a range from 0 to 100, while the values of the coefficients ke and ki are also set individually for the respective emotion types and for respective desires.

The output semantics converter module 68 of the middle ware layer 40 sends abstract behavioral commands, such as 'go ahead', 'joy', 'cry', or 'tracking (track a ball)', provided by the behavioral switching module 71 of the application layer 41, as described above, to the signal processing modules 61 to 67 of the output system 69, as shown in FIG. 4.

Given a command for a behavior, the signal processing modules 61 to 67 generates servo command values to be supplied to the associated actuators 25₁ to 25ₙ (FIG. 2) to execute the behavior, speech data of the sound to be output from the loudspeaker 24 (FIG. 2) and/or driving data to be supplied to the LED of the 'eye', based on the behavioral command, and send these data through the virtual robot 33 of the robotics server object 32 and the signal processing circuit 14 (FIG. 2) in this order to the associated actuators 25₁ to 25ₙ, loudspeaker 24 or to the LED.

In this manner, the robot apparatus 1 is able to perform an autonomous behavior, based on the control program, responsive to its own internal state, surrounding state (exterior state) or to the command or action from the user.

(3) Structure of a Robot Apparatus 1 Embodying the Present Invention

A robot apparatus 1 is able to transfer to a targeted posture or action, as the posture or action is progressively changed, as described above. It should be noted that there are occasions wherein, if a new command has been issued as the robot apparatus 1 is assuming a certain posture or performing a certain action, the robot apparatus 1 transiently changes its posture in readiness for executing the action corresponding to the command contents.

That is, the robot apparatus 1 may transfer from its state at the time of a command event to a state capable of initiating the command contents. The state here means the posture or actions.

After the robot apparatus 1 is brought to the state capable of starting the command contents, it executes the contents of the actual command to transfer to the target state. Specifically, when a command is issued in which the posture at the time of starting the action is an upstanding posture, the robot apparatus 1 transfers from the current sitting posture to an upstanding posture. For executing the contents of the command, the robot apparatus 1 commences its transfer actions, beginning from the upstanding posture, to transfer to a target posture corresponding to the ultimate state of the command contents.

Figure 9A:
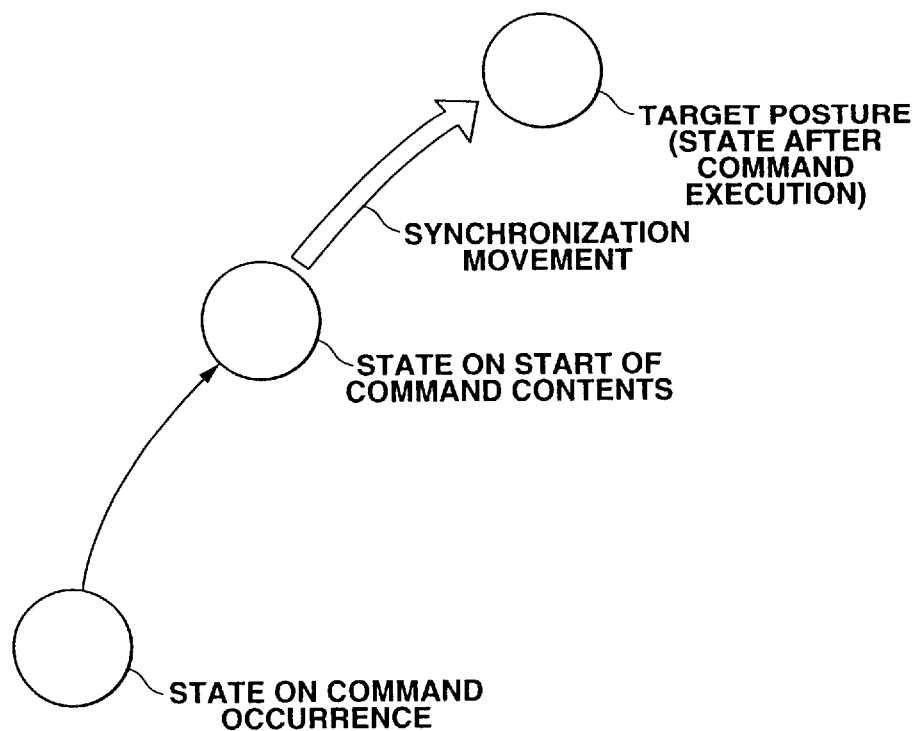
FIGS. 9A and 9B are schematic views for illustrating the initial actions and synchronous actions.
Figure 9B:
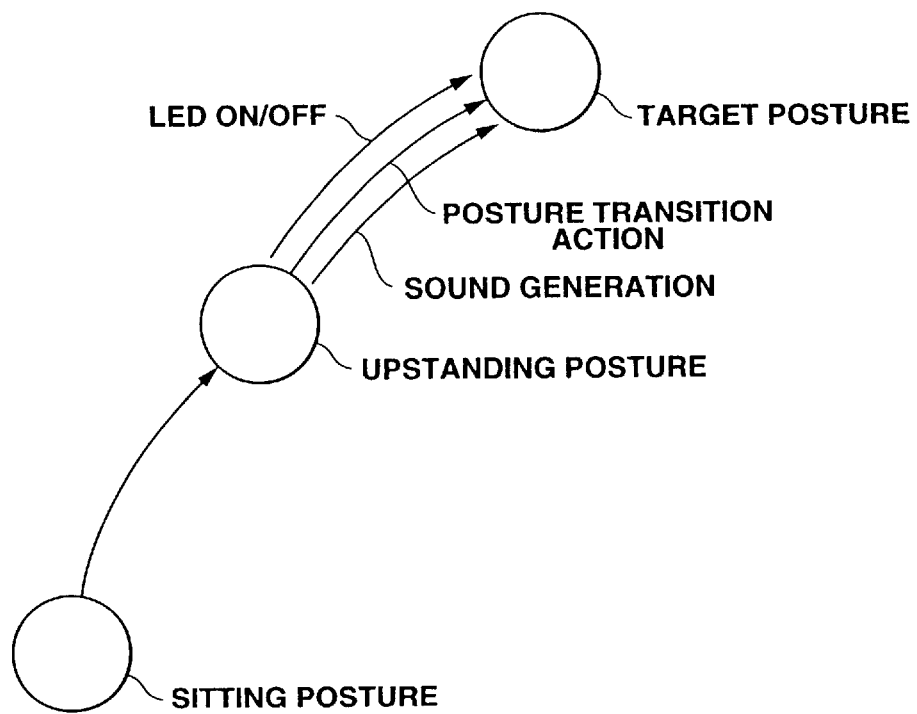

Among the command contents of the robot apparatus 1, there are those in which plural actions are to be synchronized, as shown in FIG. 9A. For example, there are occasions wherein the robot apparatus 1 generates the sound, in synchronism with its posture transition action, or flashes the LED, as shown in FIG. 9B. For example, these variable actions can be executed in synchronism with one another because respective control portions of the robot apparatus 1 responsible for execution of these actions can be controlled independently of one another. That is, the robot apparatus 1 is able to cause the loudspeaker or LEDs to be synchronized, as so-called effect devices, with other actions, whereby the sound may be produced or the LEDs may be flashed in synchronism with posture transition actions.

Figure 10:
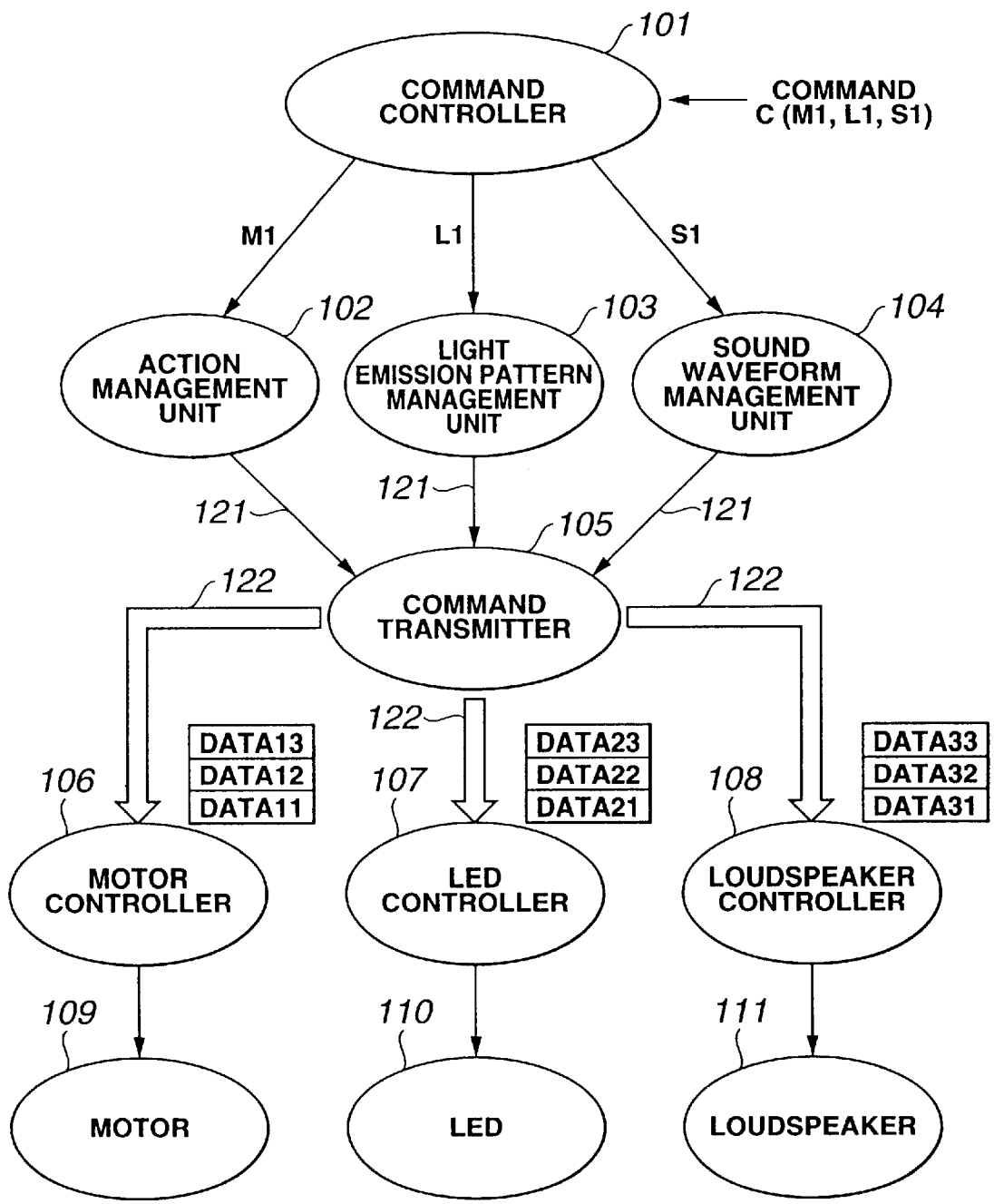
FIG. 10 is a block diagram showing the structure of essential portions of a robot apparatus embodying the present invention.

The above-described actions may be performed by the structure of the robot apparatus 1 shown schematically in FIG. 10.

It should be noted that state transition of the robot apparatus 1 shown in FIG. 9A is shown as a generalized configuration and, in the following explanation, state transition of the robot apparatus 1 shown as a concrete embodiment in FIG. 9B is taken as an example. That is, the following explanation is made for such a case wherein the state at the time of a command event is the 'sitting posture', the state at the time the synchronization command is started is the 'upstanding posture' and 'target posture' is to be performed on execution of the synchronization command.

The robot apparatus 1 includes a command controller 101, an action management unit 102, a light emitting pattern management unit 103, a sound waveform management unit 104, a command transmitting unit 105, a motor controller 106, a LED controller 107, a loudspeaker controller 108, a motor 109, a LED 110 and a loudspeaker 111. It is noted that the motor 109 is a servo motor as a concrete constituent element of each of actuators 25₁ to 25n arranged at joints of leg units 3A to 3D and at connecting portions of the respective units shown in FIG. 2. On the other hand, the loudspeaker 111 is a loudspeaker 24 as a speech uttering portion of the head unit 4, while the LED 110 is a portion having the function corresponding to that of an 'eye'.

If, in the above structure, a command is input, the command controller 101 of the robot apparatus 1 outputs corresponding commands to the action management unit 102, light emitting pattern management unit 103 and to the sound waveform management unit 104.

When fed with commands for synchronizing plural commands, the command controller 101 outputs respective commands, associated with the respective actions, referred to below as synchronization commands, to the action management unit 102, light emitting pattern management unit 103 and to the sound waveform management unit 104. When fed with commands for generating plural actions independently of one another, the command controller 101 outputs respective commands, referred to below as independent commands, to respective management units.

Figure 11:
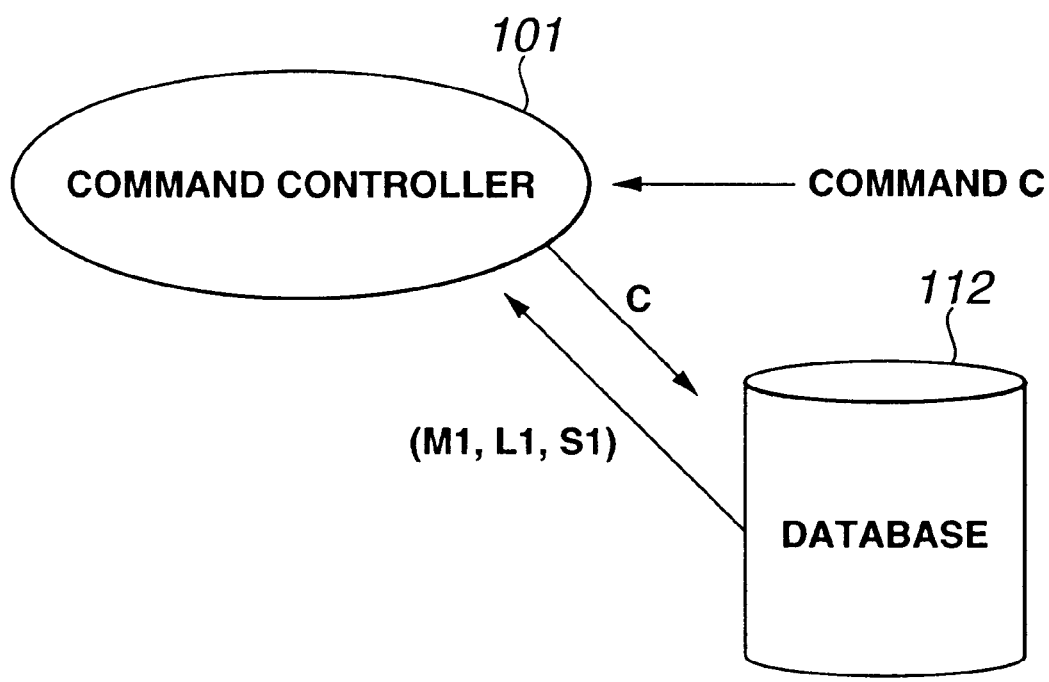
FIG. 11 is a block diagram for illustrating the relationship between a command controller and a database.

It should be noted that the command controller 101 includes a database in which input commands are associated with output synchronization commands or independent commands, so that the command controller 101 refers to the database to select the output command associated with the input command. That is, when fed with a command C which will cause synchronization of various actions, the command controller 101 refers to the database 111 to read out an associated command string C (M1, L1, S1), as shown in FIG. 11. The command controller 101 outputs the synchronization commands M1, L1, S1, indicating the contents of the command string C, to the action management unit 102, light emitting pattern management unit 103 and to the sound waveform management unit 104. Meanwhile, M1 is a synchronization command sent to the action management unit 102, referred to below as movement action command, M2 is a synchronization command sent to the light emitting pattern management unit 103, referred to below as the light emission synchronization command, and M3 is a synchronization command sent to the sound waveform management unit 104, referred to below as the sound output synchronization command.

The following explanation is made for a case in which a command which will cause synchronization of the various actions is input to the command controller 101, that is a case in which respective synchronization commands are output from the command controller 101 to the management units 102 to 104.

The action management unit 102 sends a data string corresponding to the contents of the movement synchronization command M1 to the command transmitting unit 105. Similarly, the light emitting pattern management unit 103 is responsive to the contents of the light emission synchronization command L1 to send a data string for controlling the motor 109 over a data bus 121 to the command transmitting unit 105, while the sound waveform management unit 104 is responsive to the sound output synchronization command S1 to send a data string for controlling light emission of the LED 111 in accordance with a preset light emitting pattern over the data bus 121 to the command transmitting unit 105. The sound waveform management unit 104 is responsive to the sound output synchronization command S1 to send a data string for controlling the loudspeaker 111, specifically, sound waveform data, over the data bus 121 to the command transmitting unit 105.

The command transmitting unit 105 is such a portion which renders data interpretable for a lower order constituent element or an upper order constituent element, that is standardizes data, and is a portion corresponding to the virtual robot 33 shown in FIG. 3. The command transmitting unit 105 converts the data string, sent from the action management unit 102, into a data string that can be interpreted by the motor controller 106 (data 11, data 12, data 13, . . . ) to send the so converted data string over the data bus 121 to the motor controller 106. The command transmitting unit 105 also converts the data string, sent from the light emitting pattern management unit 103, into a data strings that can be interpreted by the LED controller 107 (data 21, data 22, data 23, . . . ) to send the so converted data string over the data bus 121 to the LED controller 107, while converting the data string, sent from the sound waveform management unit 104, into a data string that can be interpreted by the loudspeaker controller 108 (data 31, data 32, data 33, . . . ) to send the so converted data string over the data bus 121 to the loudspeaker controller 108.

The motor controller 106 controls the motor 109, based on the data string input from the command transmitting unit 105 over the data bus 121. The LED controller 107 also controls the LED 110, based on the data string input from the command transmitting unit 105 over a data bus 122, while controlling the loudspeaker 111, based on the data string input from the command transmitting unit 105 over a data bus 123.

By the above sequence of actions, the robot apparatus 1 performs preset processing actions, by lower-order management units, based on the synchronization command output from the command controller 101, to execute synchronized actions.

If a command input to the command controller 101 is a command for executing a synchronous action, the synchronization action may commence to be executed by a synchronization command after initially causing posture transition. Among the processing actions for this case, there are the following three approach types (i) to (iii): (i) The command controller 101 issues a command to cause posture transition up to the synchronization command commencing posture, here an upstanding posture. This command is referred to below as a synchronization preparation command. The contents of the synchronization commands are executed, with the completion of the contents of the synchronization preparation command as a trigger.

(ii) Synchronization is caused to occur at a stage of transmitting data to the respective controllers 106 to 108 from the management units arranged in rear of the command controller 101.

(iii) The above two approach types (i) and (ii) are used in combination.

If the approach types (i) and (ii) are executed separately, the following problems are presented:

As for (i), the command controller 101 may send the synchronization commands M1, L1 and S1 to the action management unit 102, light emitting pattern management unit 103 and to the sound waveform management unit 104, respectively, with the end of the synchronization preparation command as a trigger. However, in such case, disorder in synchronization may be caused on actual occasions.

Figure 12B:
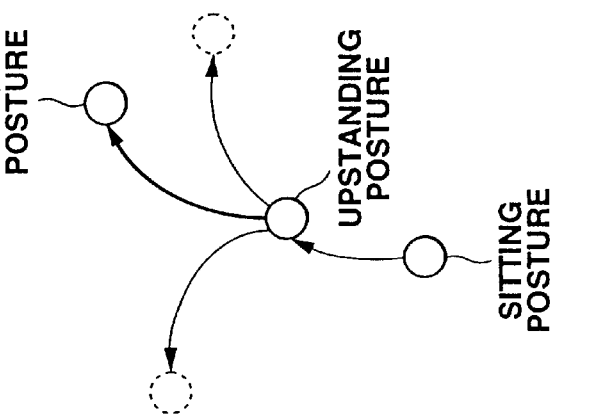
FIGS. 12A and 12B are schematic views for illustrating a case in which light emission command is delayed from a movement synchronization command.
Figure 12A:
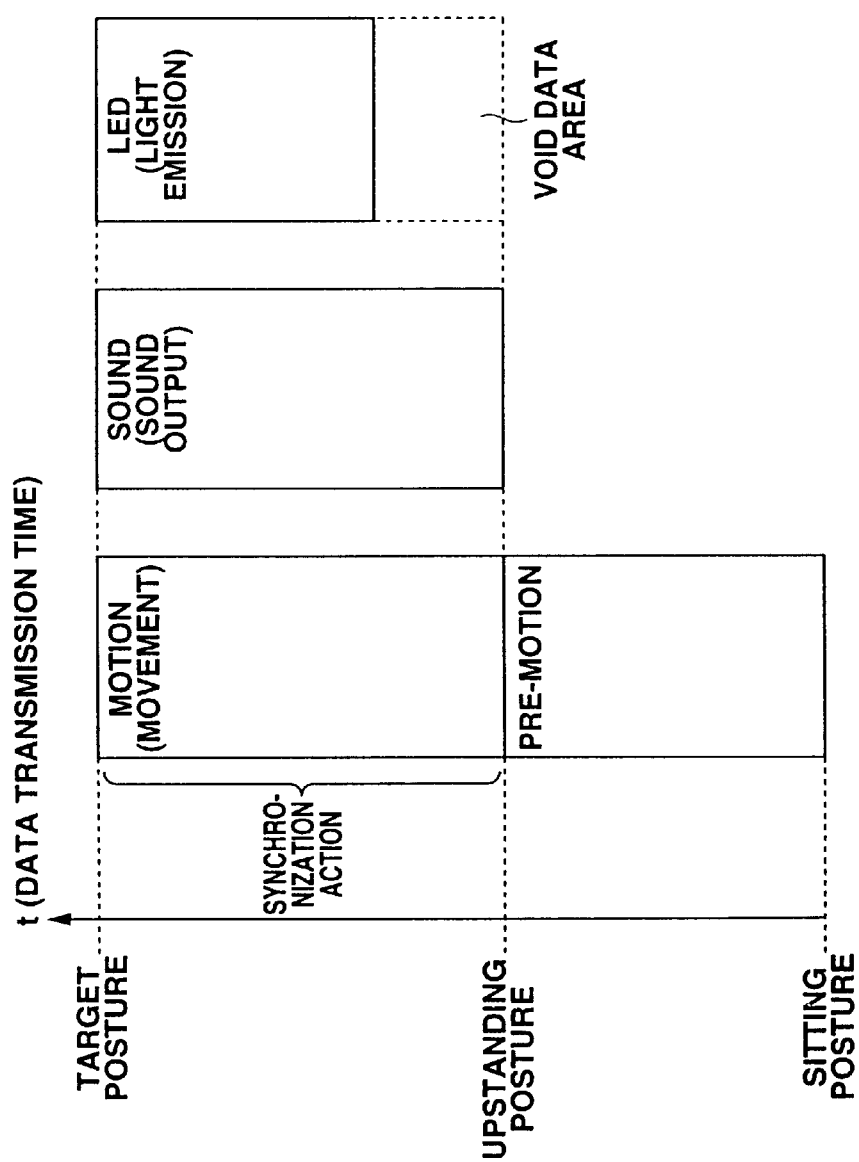

Specifically, as shown in FIG. 12A, after the end of the action from the sitting posture to the upstanding posture, executed as the contents of the synchronization preparation command (pre_Motion, referred to below as initial action), posture transition, among the synchronization actions, is caused to occur by the movement synchronization command, or by a data string corresponding to the movement command. However, it may be an occurrence that, due to delay in sending out the light emission synchronization command or a data string corresponding to the light emission synchronization command, the LED 110 emits light without synchronization thereto. This is equivalent to a void data area being produced in the data for synchronization action.

This problem arises because it is intended to supervise the synchronization command solely by the command controller 101 representing an upper-order constituent element. Meanwhile, execution of the synchronization command after transiently transferring to the upstanding posture as the transition posture may be grasped as a status transition shown in FIG. 12B.

Meanwhile, the synchronization action may be caused to take place from the sitting posture without the synchronization preparation command. In this case, synchronization control is performed without employing a synchronization preparation command. In this case, data for controlling respective action units are formed as one set. That is, data to be output to the light emitting pattern management unit 103 or the data to be output to the sound waveform management unit 104 is formed even during the time of posture transfer from the sitting posture to the upstanding posture. The data contents are those in which the LED 106 is turned off or in which the loudspeaker 107 is muted during the time of execution of the initial action.

By employing this one set of data, sound output, light emitting action and so forth are synchronized to initiate the action of the robot apparatus 1 at approximately the timing when the robot apparatus 1 has just assumed its upstanding posture, as shown for example in FIG. 12A.

However, apart from the labor involved in preparing one set of data, there is produced such inconvenience that, since data is input to the LED controller 107 and to the loudspeaker controller 108 that are in actuality not controlled in action during execution of the initial action, it is not possible to cause the LED controller 107 and the loudspeaker controller 108 to perform other actions during the time of the initial action. For example, if a command with the higher priority rank, such as an independent command, is issued, the command contents cannot be executed by the LED 110 or by the loudspeaker 111. Moreover, the action cannot be started without fail in association with the transition to the upstanding posture, such that it may be an occurrence that light emission of the LED 110 commences with certain delay, as shown for example in FIG. 13A.

Figures 13A, 13B:
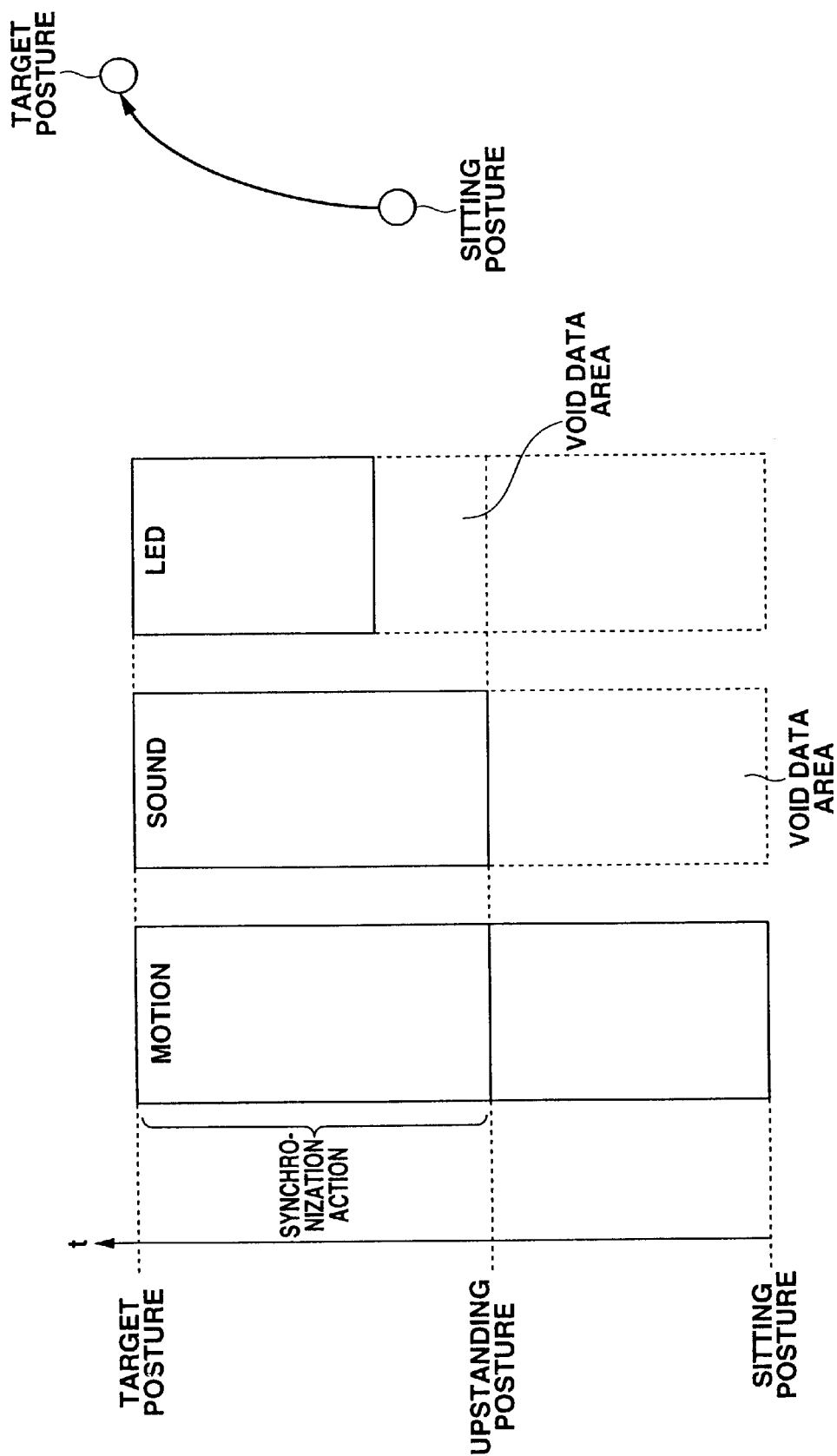
FIGS. 13A and 13B are schematic views for illustrating a case in which synchronized action is brought about by data for synchronization in the form of one-set data.
Figure 14:
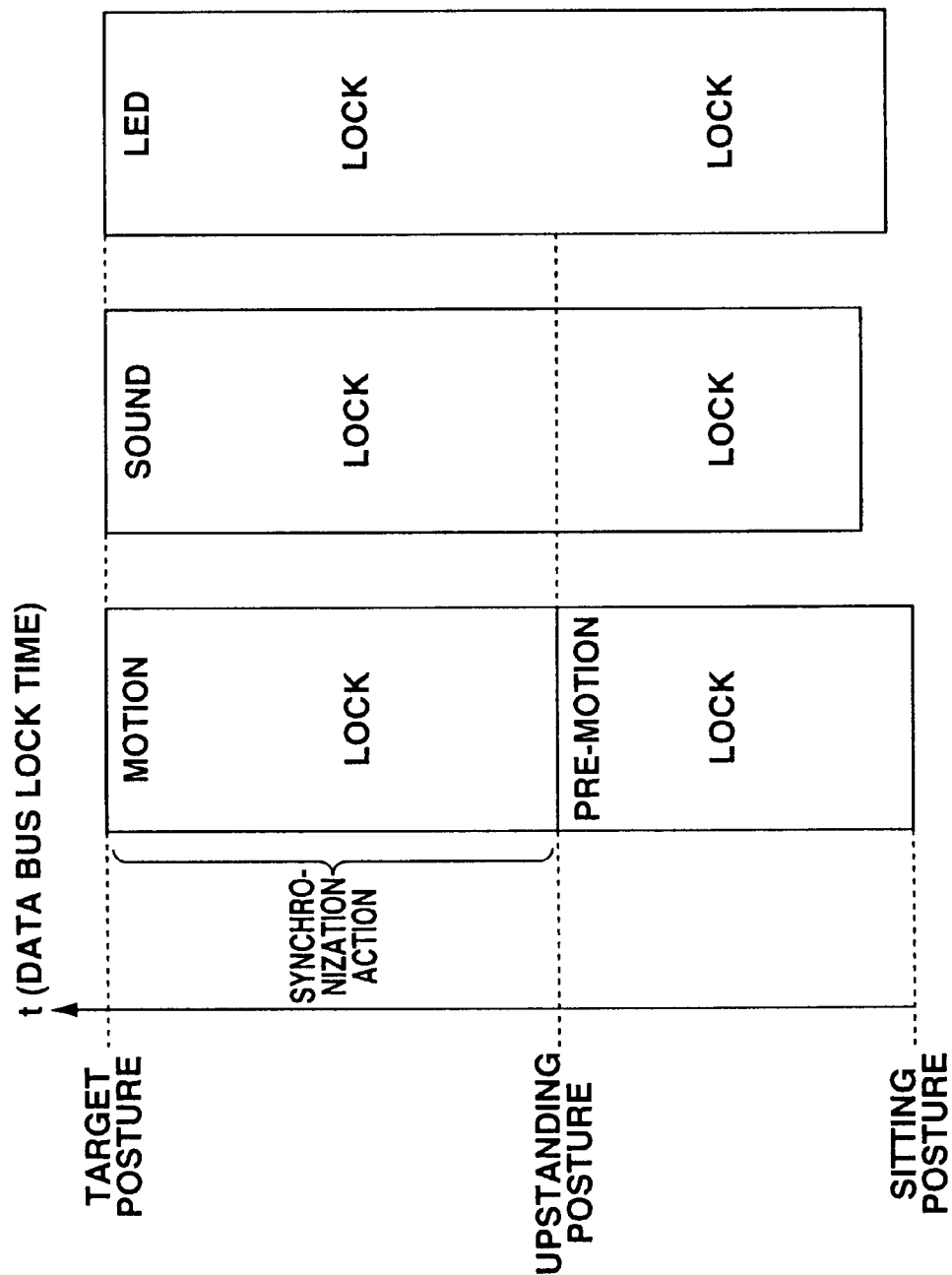
FIG. 14 is a schematic view for illustrating a case in which a data bus is locked.

Meanwhile, the status transition in case of using one set of data for the above actions may be grasped as status transition of a continuum of actions from the sitting posture to the target posture, as shown in FIG. 13B.

As for (ii) above, it may be contemplated to achieve synchronization at a stage of transmitting data from the command transmitting unit 105 to the downstream side controllers 106 to 108. In such case, a synchronization command is previously issued, that is issued during the time of execution of the initial action, such as at the same time as the initial action is being carried out, so that data for synchronization actions from the respective management units 102 to 104 are held in the memory that can be referred to by the command transmitting unit 105. However, in this case, the memory is unusable for other purposes, and hence this method cannot be said to be optimum for efficient memory utilization.

Moreover, if the synchronization command is previously issued, the data bus 121 interconnecting the management units102 to 104 and the command transmitting unit 105 is locked until such time that the synchronization command comes to a close. This renders it impossible to open the data bus 121, such that, during the time of execution of the initial action, as the contents of the synchronization preparation action, the sound, for example, cannot be issued.

That is, among the commands for light emission for the LED 110 or outputting the sound, for example, there are independent commands other than the commands for the synchronous action. The command transmitting unit 105 sends these independent commands to the light emitting pattern management unit 103 and to the sound waveform management unit 104 even during the time of stand-by state readying for execution of the synchronization command.

Figure 15:
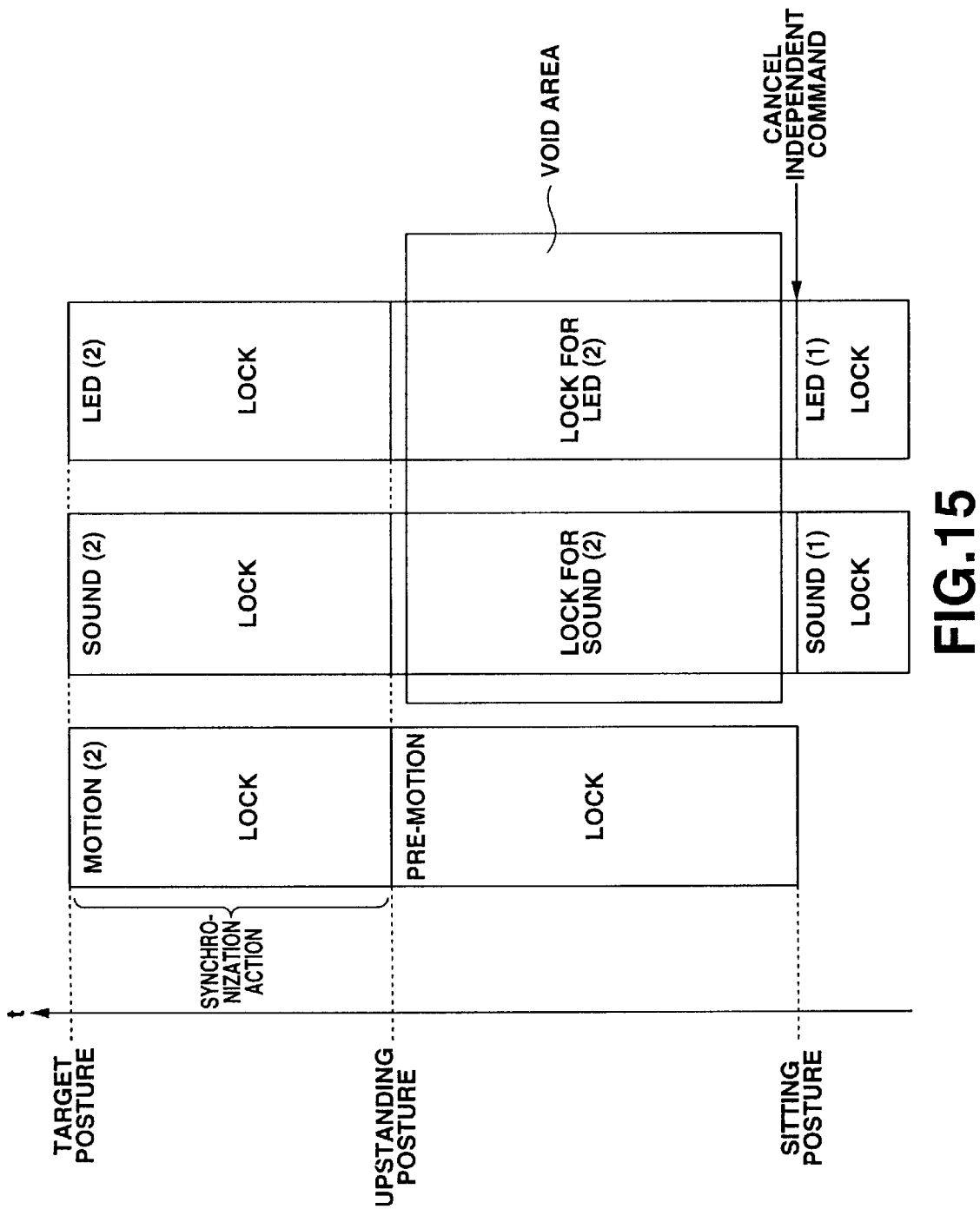
FIG. 15 is a schematic view for illustrating another case in which a data bus is locked.

Should these independent commands, as the other commands, be transmitted, the data bus 121 is locked, as shown in FIG. 15. In such case, the data canceling processing needs to be carried out. Specifically, the data already transmitted from the light emitting pattern management unit 103 and the sound waveform management unit 104 to the command transmitting unit 105 are required to be canceled, such that unrealistic processing is to be carried out.

It may be seen from above that the above processing (i) or (ii), used alone, is problematical, however, the problem which might be raised by the processing (i) or (ii) alone may be solved by the combination of (i) and (ii), which is the approach (ii). The present invention is directed in its principle to this approach (iii). In actuality, the processing of the approach (iii) is optimized in minute details.

According to the present invention, independent commands may be executed on the LED 110 or the loudspeaker 111 which are in the actionally free state during the time of execution of the initial action. Moreover, according to the present invention, the data string of the contents of the synchronization command is not sent out on the data bus during the time of execution of the initial action. This renders it possible to erase the synchronization command extremely readily if independent commands are produced.

Figure 16:
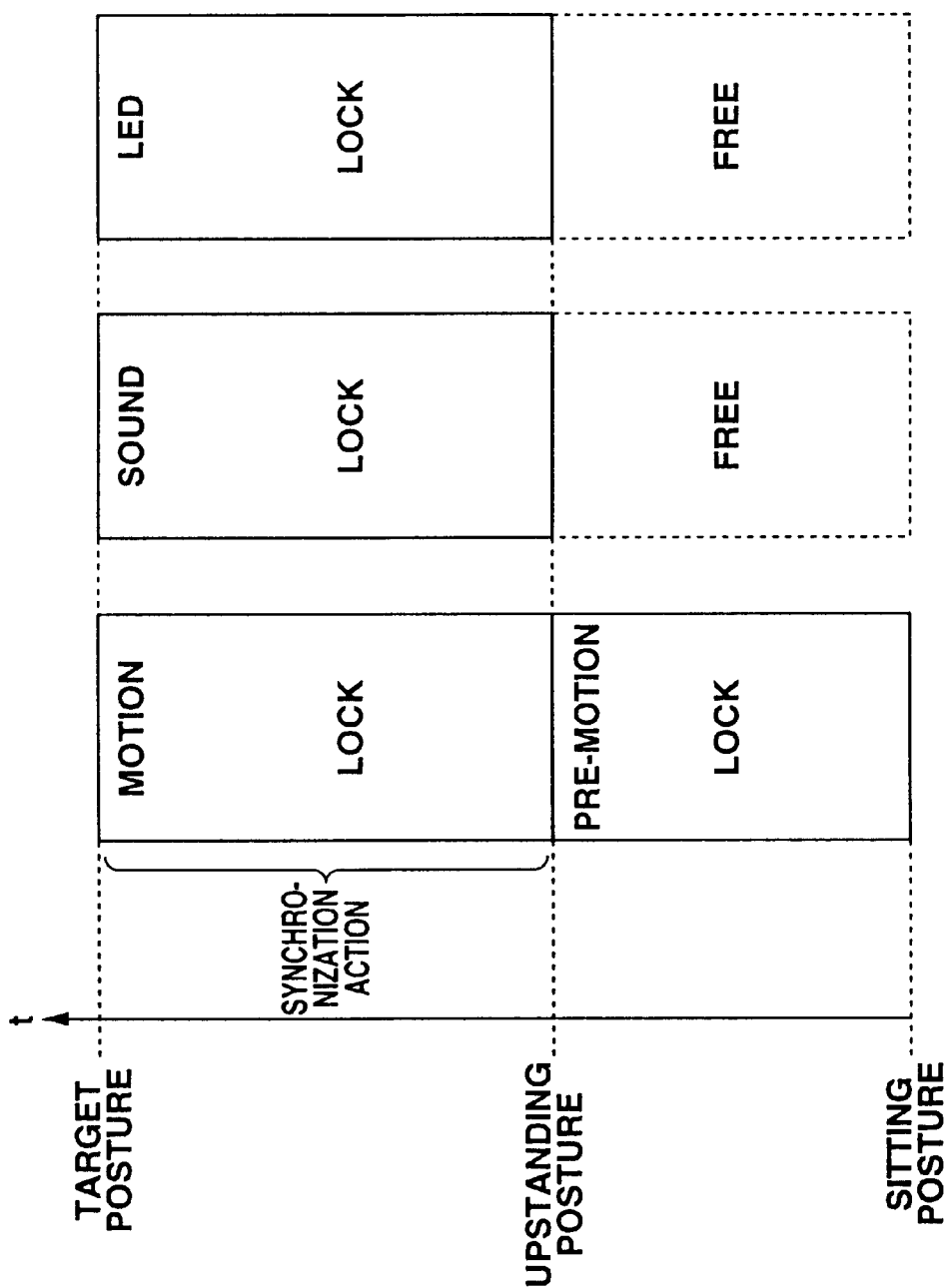
FIG. 16 is a schematic view for illustrating the processing enabled on application of the present invention.
Figure 17:
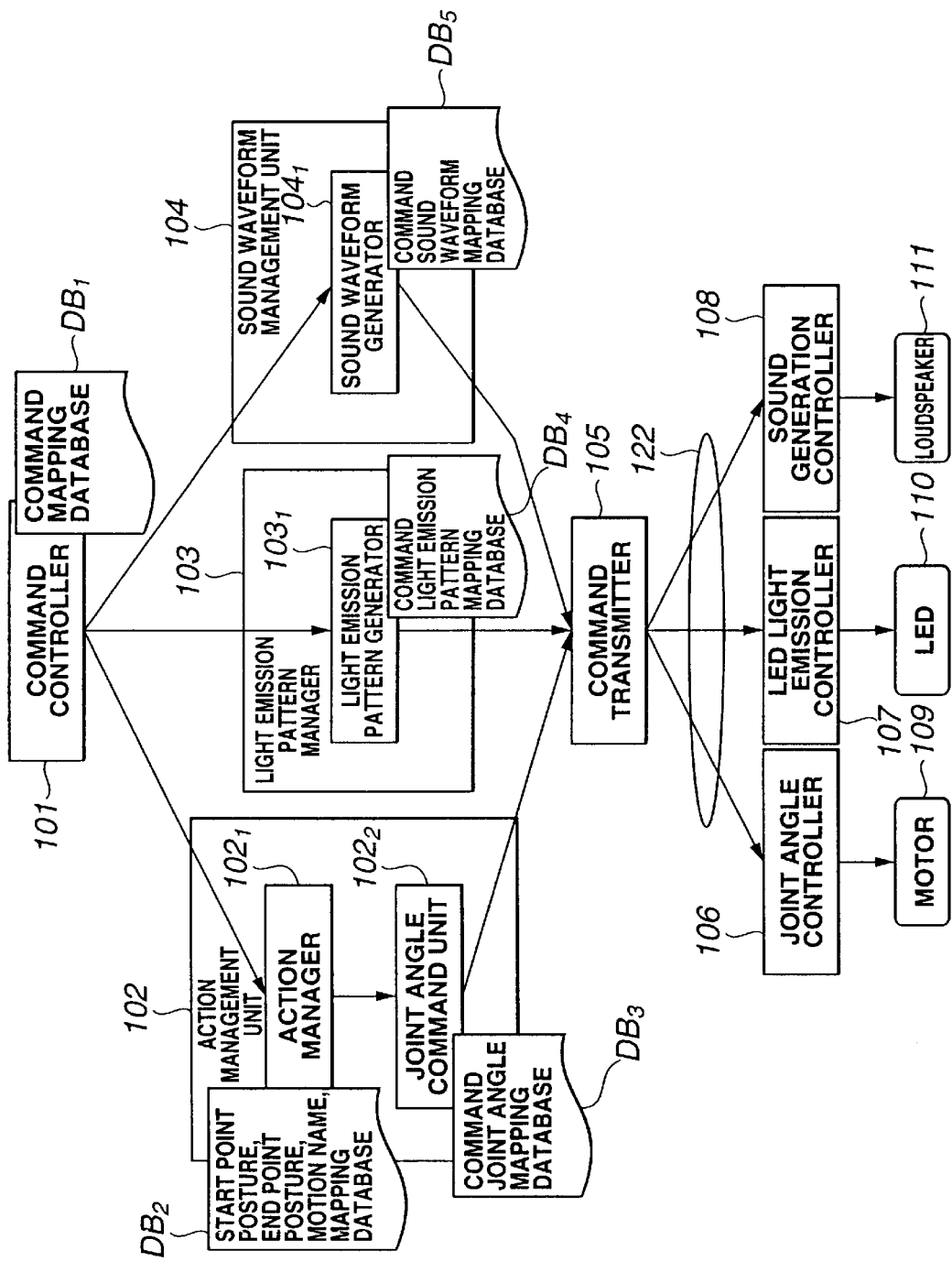
FIG. 17 is a block diagram for illustrating a concrete structure of essential portions of a robot apparatus embodying the present invention.

That is, as shown in FIG. 16, the LED 110 and the loudspeaker 111 are rendered operable by e.g., an independent command during the time the initial action is being executed, while it is rendered possible that the data string of contents the synchronization commands cannot be sent over the data bus. A specified example is given below. FIG. 17 shows a concrete structure of the robot apparatus 1 performing this processing.

The robot apparatus 1 includes a command controller 101, an action management unit 102, a light emitting pattern management unit 103, a sound waveform management unit 104, a command transmitting unit 105, a joint angle controller 106, as a concrete instance of the motor controller 106, a LED light emission controller 107, as a specified example of the LED controller 107, a sound generation controller 108, as a specified instance of the loudspeaker controller 108, a motor 109, an LED 110 and a loudspeaker 111.

The action management unit 102 achieves the processing by an action management unit $102_1$ and a joint angle command unit $102_2$. The light emitting pattern management unit 103 realizes the processing by a light emission pattern generating unit $103_1$, while the sound waveform management unit 104 realizes the processing by a sound waveform generator $104_1$.

The command controller 101 includes a database $DB_1$ in which commands are mapped to one another. For example, the database $DB_1$ includes a database 112 in which an input command C is mapped to the commands M1 L1, S1 to be output to the action management unit 102, light emitting pattern management unit 103 and to the sound waveform management unit 104 of the lower order, as shown in FIG. 11.

The action management unit $102_1$ includes a database $DB_2$ in which the start-point posture, end-point posture and the names of the motions are mapped to one another. The joint angle command unit $102_2$ includes a database $DB_3$ in which the commands and joint angle data are mapped to one another. The light emission pattern generating unit $103_1$ includes a database $DB_4$ in which the commands and the light emission pattern data are mapped to one another, while the sound waveform generator $104_1$ includes a database $DB_5$ in which the commands and the sound waveform data are mapped to one another.

The command controller 101 and the respective management units 102 to 104 output data associated with input commands to lower-order constituent elements by the databases in which variable data are mapped as described above. Meanwhile, in the databases of the joint angle command unit $102_2$, light emission pattern generating unit $103_1$ and the sound waveform generator $104_1$, the commands associated with the respective data are synchronization commands or independent commands.

In the above-described structure, the motor 109, LED 110 and the loudspeaker 111 are action means for producing the actions, while the command controller 101, action management unit 102, light emitting pattern management unit 103, sound waveform management unit 104, command transmitting unit 105, motor controller 106, LED controller 107 and the loudspeaker controller 108 are control means for controlling the actions of the motor 109, LED 110 and the loudspeaker 111 as plural action means. The control means are designed to produce synchronous actions by plural action means, here the motor 109, LED 110 and the loudspeaker 111, as subsequent actions, next following the end of the previous actions of the action means, here the motor 109.

Specifically, the command controller 101 operates as a command controller adapted for outputting an output command associated with an input command. The action management unit 102, light emitting pattern management unit 103 and the sound waveform management unit 104, provided in association with the motor 109, LED 110 and the loudspeaker 111, as plural action means, operate as data transmission controller for transmission control of variable action control data output by the management units 102 to 104. The motor controller 106, LED controller 107 and the loudspeaker controller 108 are provided in association with the motor 109, LED 110 and the loudspeaker 111, respectively, and operate as plural action controllers controlling the action of the motor 109, LED 110 and the loudspeaker 111, based on the action control data output by the command transmitting unit 105. The command transmitting unit 105 operates for transmitting the action control data for synchronization, output by the management units 102 to 104, to the motor 109, LED 110 and the loudspeaker 111 in unison. Meanwhile, the command controller 101, command transmitting unit 105 and the above-mentioned action controllers may also be objects or processes constructed by the object-oriented programming. The respective constituent elements are hereinafter explained along the processing flow.

The command controller 101 outputs commands, associated with the action management unit 102, light emitting pattern management unit 103 and the sound waveform management unit 104, based on input commands. That is, the command controller 101 refers to the database DB, to output synchronization commands or independent commands, associated with the input commands, to the action management unit 102, light emitting pattern management unit 103 and to the sound waveform management unit 104.

When the commands output to the respective management units 102 to 104 are synchronization commands, the command controller 101 appends synchronization IDs and point values to the synchronization commands to send the resulting data string to the management units 102 to 104. For example, the command controller 101 appends the synchronization ID and the point values to the leading end of the synchronization command to output the resulting data string. It is noted that the synchronization ID and the point values are used e.g., by the downstream side command transmitting unit 105. Specifically, it suffices if the IDs of the synchronization commands to be synchronized and the total number of the synchronization commands to be synchronized are appended as described above. For example, the point values are numerical figures, and are determined so that the sum total of the point values output to the management units 102 to 104 will be equal to a preset number. In the present embodiment, the preset number (sum) is assumed to be 100.

If the initial action is required on receipt of the command, that if the robot apparatus 1 is in the sitting posture, the command controller 101 outputs a synchronization preparation command to the action management unit 102 and subsequently outputs, at a preset timing, the movement synchronization command M1, the light emission synchronization command L1 and the sound output synchronization command to the management units 102 to 104, respectively. In the following, explanation is made of such a case wherein, when the robot apparatus 1 is in the sitting posture, the command controller 101 outputs the synchronization preparation command to the management unit 102.

In the action management unit 102, the action management unit $102_1$ selects the motion name. The action management unit 102 includes the database DB2 in which the start point posture and the end point posture are associated with the motion name representing the movement contents. The action management unit 102 refers to this database DB2 to select the motion name associated with the synchronization preparation command indicating the contents of the initial action. The action management unit $102_1$ outputs this motion name to the joint angle command unit $102_2$. The joint angle command unit $102_2$ refers to the database $DB_3$ to output a data string which is the time-domain joint angle command value for executing the input motion name to the command transmitting unit 105.

The command transmitting unit 105 sends the data strings, sent from the action management unit 102, as a set, to the joint angle controller 106 over the data bus 122.

The joint angle controller 106 controls the motor 109, based on input data. Since the input data is the synchronization preparation command for performing the initial action, the robot apparatus 1 performs the action of transferring from the sitting posture to the upstanding posture, under control by the motor 109.

The initial actions are executed based on the synchronization preparation commands, as described above. The processing for the synchronization actions, performed in succession as from the timing of the end of the initial action, is hereinafter explained.

The command transmitting unit 105 outputs data for the initial action to the joint angle controller 106, at the same time as it sends a transmission enabled state indicating signal at a preset timing to the action management unit 102. The preset timing, which will be explained in detail subsequently, is the timing corresponding to the residual data being equal to the anticipated data receipt delay time in the command transmitting unit 105. This renders it possible to execute the synchronization actions consecutive to the initial action in succession without delay.

Responsive to the transmission enabled state indicating signal, the action management unit 102 sends a synchronization command receipt enabled signal to the command controller 101.

At the receipt timing of the synchronization command receipt enabled signal, the command controller 101 outputs synchronization commands for synchronization actions, executed after the end of the initial action, to the management units 102 to 104.

In the action management unit 102, the action management unit $102_1$ refers to the database $DB_2$ to output the motion name which executes the contents of the input movement synchronization command to the downstream side joint angle command unit $102_2$. The joint angle command unit $102_2$ refers to the database DB3 to output the time-domain data string associated with the input command to the command transmitting unit 105.

In the light emitting pattern management unit 103, the light emission pattern generating unit $103_1$ refers to the database DB4 to output to the command transmitting unit 105 a data string of a light emission pattern which is the time-domain data associated with the input light emission synchronization command. In the sound waveform management unit 104, the sound waveform generator $104_1$ refers to the database DB5 to output to the command transmitting unit 105 a datastring of the sound waveform which is to be time-domain data associated with the input sound output synchronization command.

In this manner, the management units 102 to 104 output data strings associated with the respective input synchronization commands to the command transmitting unit 105. Since these data strings are data relevant to synchronization commands, the aforementioned synchronization IDs and the point values have been accorded by the command controller 101 to the leading ends of the data strings.

Figure 18:
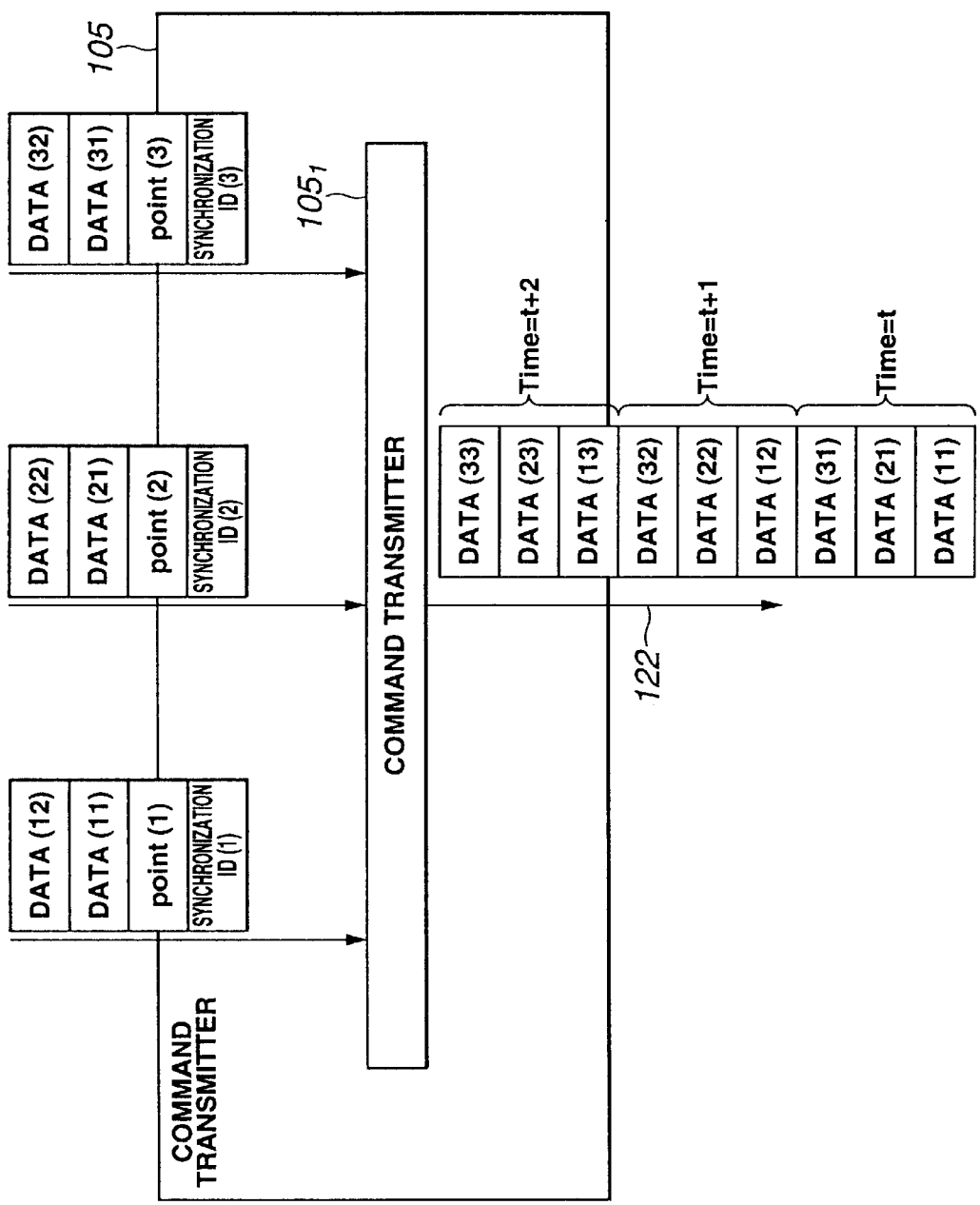
FIG. 18 is a schematic view for illustrating the structure of a command transmitter as a constituent element of the essential portions of the robot apparatus.
Figure 19:
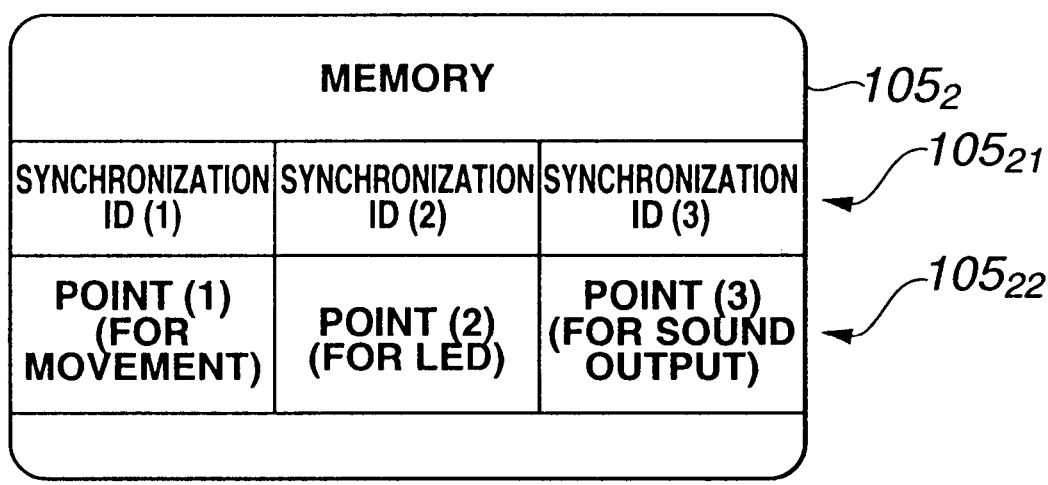
FIG. 19 is a diagrammatic view showing the structure of a memory as a constituent element of the essential portions of the robot apparatus.

The command transmitting unit 105 performs control to transmit the data strings, sent from the respective management units 102 to 104, over the data bus 122 to the lower-order controllers 106 to 108. Specifically, the processing in the command transmitting unit 105 is executed as follows:

The command transmitting unit 105 includes a command transmitter $105_1$ and a memory $105_2$, shown in FIG. 19, as shown in FIG. 18.

In the command transmitter 105, the command transmitter $105_1$ is fed with synchronization IDs, point values and data strings output from the management units 102 to 104. Referring to FIG. 18, the synchronization ID (1), point value (1), data (11), data (12), . . . , are associated with the synchronization IDs, point value and the data string from the action management unit 102, the synchronization ID (2), point value (2), data (21), data (22), . . . , are associated with the synchronization IDs, point values and the data string from the light emitting pattern management unit 103 and the synchronization ID (3), point values (3), data (31), data (32), . . . , are associated with the synchronization IDs, point values and the data string from the sound waveform management unit 104.

If the synchronization ID and the point value are written in the header area in the input information, the command transmitter 105 writes the synchronization ID and the point values on the memory $105_2$. In the memory $105_2$, an area $105_{21}$ for storage of the synchronization ID, referred to below as synchronization ID storage area, and an area $105_{22}$ for storage of the point values, referred to below as point value storage area, are reserved, so that the synchronization IDS and the point values are stored in association with the respective management units 102 to 104, as shown in FIG. 19.

Based on these point values, the command transmitter $105_1$ controls the output to the controllers 109 to 111 of the subsequently input data strings. Specifically, this control is performed as follows:

The command transmitter $105_1$ checks the point value storage area $105_{22}$ of the memory $105_2$ and, if the point values are stored therein, it is checked whether or not the sum of the point values is equal to 100, which is retained to be a preset number 100.

If the commands in question are synchronization commands, the sum of the point values output by the management units 102 to 104 is adapted to be 100. That is, the pointer (1) is 20, the pointer (2) is 10 and the pointer (3) is 70, for example, so that the sum total will be 100.

When the sum total of the point values is 100, the command transmitter $105_1$ re-arrays or sets the data to data (11), data (21), data (31), data (12), data (22), . . . , to adapt the data to the sole data bus 122, as shown in FIG. 18, to output the resulting data to the downstream controllers 109 to 111. As for the output timing of the data string on the data bus 122, the data are synchronized in data units as output from the management units 102 to 104. That is, the data (11), (21), (31) are output at a timing t, the data (12), (22), (32) are output at timing t+1 and the data (13), (23), (33) are output at a timing t+2, as shown in FIG. 18.

In this manner, the data synchronized at a time point when the sum total of the point values is equal to 100 are input to the associated downstream side units, namely the joint angle controller 106, LED controller 107 and the loudspeaker controller 108.

Figure 20:
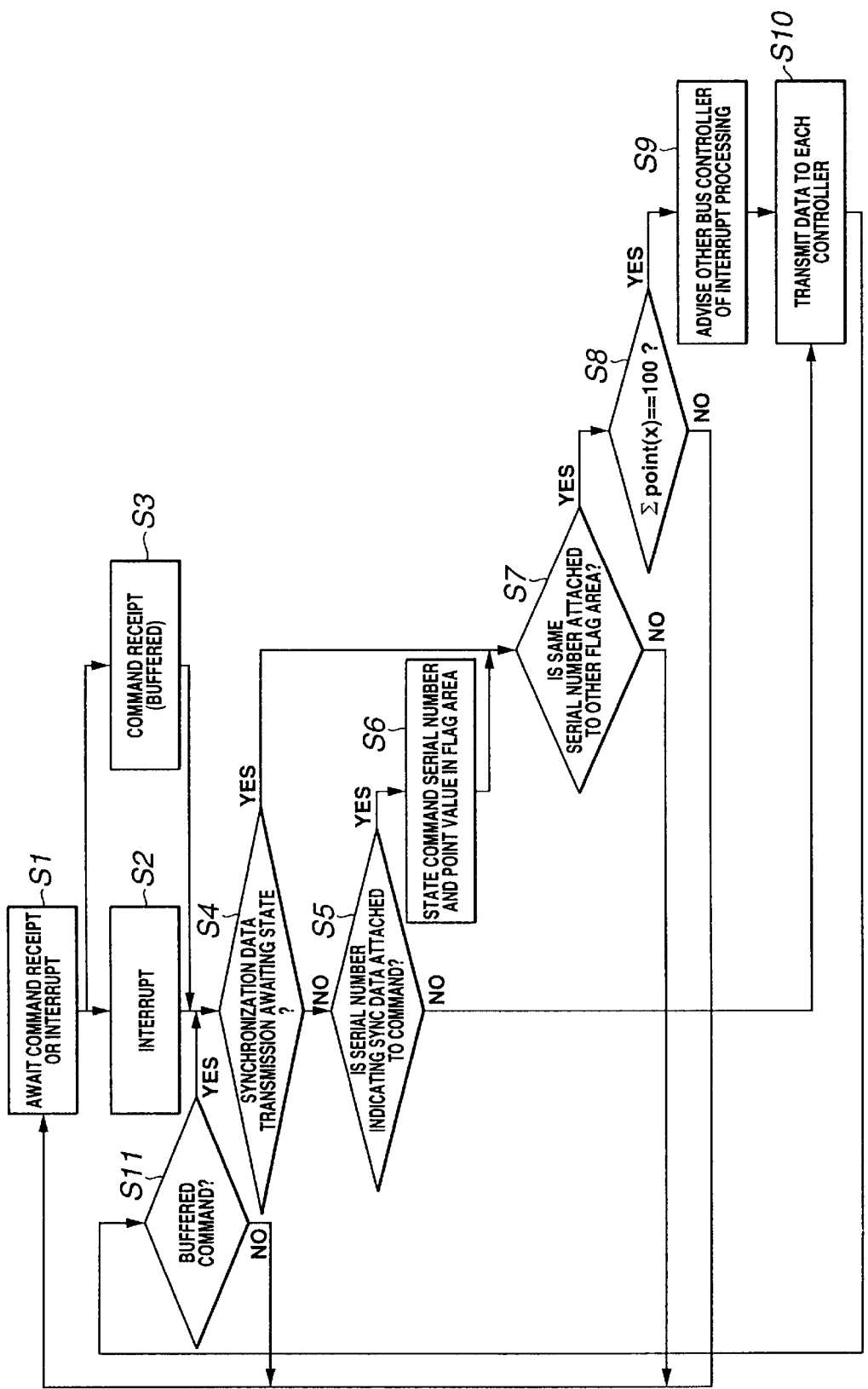
FIG. 20 is a flowchart showing the processing sequence in the above portions.

The above is the manner in which processing in the command transmitter 105 is executed. FIG. 20 shows the flowchart showing the processing flow in the command transmitter 105.

If, when the command receipt or interrupt is being awaited at step S1, an interrupt request is made, the command transmitter 105 at step S2 proceeds to interrupt the processing to proceed to step S4. If, in the state of step S1, a command (e.g., a data string output by the management unit) is transmitted to the command transmitter 105, the command transmitter receives the command. For example, the command transmitter 105 buffers the so transmitted data string, and then proceeds to step S4.

At step S4, the command transmitter 105 checks whether or not transmission of the synchronization data is being awaited. If the transmission of the synchronization data is being awaited, the command transmitter 105 proceeds to step S7 and, if otherwise, the command transmitter 105 proceeds to step S5.

The command transmitter 105 at step S5 checks whether or not the serial number indicating the synchronization data is appended to the command. The serial number is the aforementioned synchronization ID. Ths decision processing is carried out in case a command, such as a data string, has been received at the above step S3.

If, at step S5, the serial number indicating the synchronization data is appended to the command, the command transmitter 105 proceeds to step S6. If otherwise, the command transmitter 105 proceeds to step S10.

The command transmitter 105 at step S6 enters the serial number and the point value, afforded to the command, in a flag area of the memory $105_2$, and then proceeds to step S7.

The step S7 is a step to which the command transmitter 105 also proceeds when at step S4 the transmission of the synchronization data is being awaited. At this step S7, the command transmitter 105 determines whether or not there is the same serial number in another portion of the flag area. If the same serial number is afforded to another portion in the flag area, the command transmitter 105 proceeds to step S8 and, if otherwise, the command transmitter 105 reverts to step S1.

The command transmitter 105 at step S8 checks whether or not the sum total of the point values (point (x)) associated with the area having the same serial number is equal to 100. If the sum total of the point values is equal to 100, the command transmitter 105 proceeds to step S9 and, if otherwise, the command transmitter 105 reverts to step S1.

The command transmitter 105 at step S9 requests other bus controllers to permit interrupt processing and, at step S10, commences transmission of the data string to the respective controllers 106 to 108 over the data bus 122.

As the command transmitter 105 sends the data string to the respective controllers, it also checks at step S11 whether or not there is any command that has been buffered. If there is any buffered command, the command transmitter 105 proceeds to step S4 and, if otherwise, the command transmitter 105 reverts to step S1.

The command transmitter 105 executes the processing as described above. By this processing, the controllers 106 to 108, fed with data from the command transmitter 105, control the motor 109, LED 110 and the loudspeaker 111, based on the input data. Since the controllers 106 to 108 control the motor 109, LED 110 and the loudspeaker 111 based on the data input at the controlled timing, the movement by the motor 109, light emission by the LED 109 and the sound output by the loudspeaker 111, as the actions performed on the actual robot apparatus, are synchronized.

Moreover, since the outputting timing of the transmission enabled state indicating signal from the command transmitter 105 to the action management unit 102 is such as to cause the synchronization action to be started in succession without being delayed with respect to the completion of the initial action, the robot apparatus 1 realizes synchronization actions in succession to the initial action.

When the sum total of the point values is equal to 100 in the command transmitter $105_1$, the motor 109, LED 110 and the loudspeaker 111 are able to be operated in synchronism with one another, as described above. If otherwise, that is if the sum total of the point values in the command transmitter $105_1$ is not 100, the state of awaiting the data string inputting is set. In this synchronization command awaiting state, the robot apparatus 1 is able to execute independent commands. This is accomplished by the following processing sequence:

If a command for independently actuating the LED 110 or the loudspeaker 111 without synchronization to the movement action is input to the command controller 101, independent commands are output to the downstream side light emitting pattern management unit 103 or to the sound waveform management unit 104, as a result of the command controller 101 making reference to the database DB1. In the following, explanation is made for a case wherein the independent commands are input from the command controller 101 to the light emitting pattern management unit 103 and to the sound waveform management unit 104 and wherein the contents of the respective independent commands for the LED 110 and the loudspeaker 111 are also independent of each other. In the case of the independent command, in distinction from the case of the synchronization commands, the command controller 101 outputs the commands without appending the synchronization IDs or the point values thereto.

In the light emitting pattern management unit 103, the light emission pattern generating unit $103_1$ refers to the database DB4 to output the data string associated with the input independent command to the command transmitter 105. Also, in the sound waveform management unit 104, the sound waveform generator $104_1$ refers to the database DB5 to output the data string associated with the input independent command to the command transmitter 105.

The management units 103, 104 output the data strings to thec105, as described above. It should be noted that, since these data strings are not synchronization commands, no synchronization IDs nor point values are appended to the data strings.

The command transmitter 105 checks the header area of the input data string and, since there is no synchronization ID, the command transmitter 105 recognizes that the data strings are the independent commands. Thus, it sets the data strings directly on the data bus 122 to output the data strings to the LED controller 107 and to the loudspeaker controller 108. This processing is performed by the function of the command transmitter 105 that, when a data string not having the synchronization ID nor point values appended thereto is input to the command transmitter 105, the point values are not monitored, in distinction from the case of the data string relevant to the synchronization command, but the data string is directly output to the associated downstream side controller.

So, with the data string corresponding to the synchronization command, the data string is in a state of awaiting data input until the sum total of the point values is equal to 100. However, the command transmitter 105 sets the data string relevant to the independent command on the data bus 122 to output the so set data strings to the LED controller 107 and to the loudspeaker controller 108. That is, the data string corresponding to the independent commands is output to the LED controller 107 and to the loudspeaker controller 108 in preference to the data string relevant to the synchronization commands.

The LED controller 107 controls the light emitting action of the LED 110 based on the data string input over the data bus 122. The loudspeaker controller 108 controls the outputting of the loudspeaker 111 based on the data string input over the data bus 122.

By this processing, the robot apparatus 1 is able to perform light emission of the LED 110 or sound emission by the loudspeaker 111, even during the time the robot apparatus 1 is executing the initial action such as transition from the sitting posture to the upstanding posture.

Figure 21:
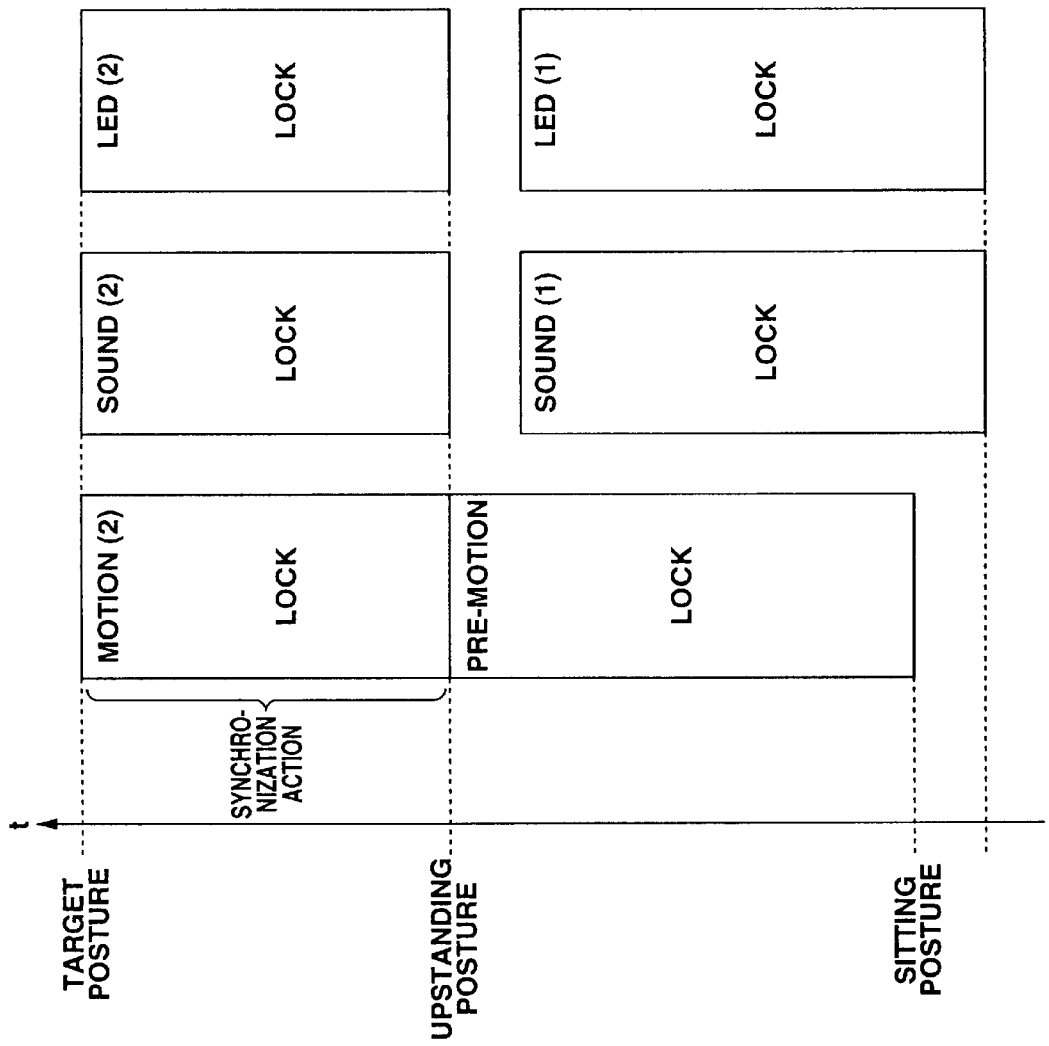
FIG. 21 is a diagrammatic view for illustrating the concrete processing enabled on application of the present invention.

Specifically, the robot apparatus 1 according to the present invention performs the processing shown in FIG. 21.

Referring to FIG. 21, the robot apparatus 1 is able to perform light emission actions by the LED 110 and sound emission by the loudspeaker 111, in synchronism with the movement action, following the completion of the initial action of transferring from the sitting posture to the upstanding posture. Moreover, since the data buses interconnecting the respective constituent elements are not locked by data, but are in the free state at all times, the light emission and sound emission pertinent to the independent commands can be carried out by the LED 110 and by the loudspeaker 111, respectively.

Although the explanation of the present embodiment is made for a case where the contents of the independent commands are such that the action by the LED 110 and that by the loudspeaker 111 are performed independently of each other, this is merely illustrative, such that the synchronization actions of the LED 110 and the loudspeaker 111 may be executed independently of the initial action. That is, the aforementioned independent commands are those retained to be independent only in connection with the other commands such that these independent commands may be said to be independent in the relative sense of the term.

The command controller 101 outputs these independent commands, indicating the contents of the synchronization action, to the light emitting pattern management unit 103 and to the sound waveform management unit 104. These commands are referred to below as the independent synchronization commands.

The command controller 101 appends the synchronization ID and the point value to each of the independent synchronization commands. When the synchronization commands have already been output, the synchronization IDs appended to the respective independent synchronization commands are made to differ from the synchronization IDs appended to the synchronization commands.

The light emitting pattern management unit 103 and the sound waveform management unit 104 output the data strings, corresponding to the independent synchronization commands, to the command transmitter 105.

In the command transmitter 105, the command transmitter $105_1$ is fed with the synchronization IDs, point values and the data strings, output by the light emitting pattern management unit 103 sound waveform management unit 104.

The command transmitter 105 causes the synchronization IDs and the point values, entered in the header area in the input information, to be stored in the synchronization ID storage area $105_{21}$ and in the point value storage area $105_{22}$ in the memory $105_2$. The command transmitter 105 reads out the point values associated with the same synchronization ID stored in the synchronization ID storage area $105_{21}$ and finds the sum total of the point values. When the sum total has reached a preset value, thec105 synchronously outputs the data string relevant to the synchronization ID to the LED controller 107 and to the loudspeaker controller 108.

The preset value, which is to be the sum total of the point values representing an output condition of data relevant to the independent synchronization commands may, for example, be set to 10, which is different from the preset value of, for example, 100, for the synchronization command executed next to the initial action. In this case, the command controller 101 adds the point values to the respective independent synchronization commands so that the sum total of the commands will be equal to 10. For example, the point value of 4 is appended to the independent synchronization command pertinent to the action of the LED 110, while the point value of 6 is appended to the independent synchronization command pertinent to the action of the loudspeaker 111. When the sum total of the point values with the same synchronization ID is 10, the command transmitter 105 synchronously outputs the data string pertinent to the independent synchronization commands associated with the synchronization ID to the LED controller 107 and to the loudspeaker controller 108.

The LED controller 107 and the loudspeaker controller 108 control the LED 110 and the loudspeaker 111 based on the input data. Since the LED controller 107 and the loudspeaker controller 108 control the LED 110 and the loudspeaker 111 based on the data input at the synchronized timing, the light emission action by the LED 110 and the sound emission by the loudspeaker 111, retained to be the actions performed on the robot apparatus 1, are synchronized, these actions being performed along with the initial action corresponding to the posture transition.

The output timing of the transmission enabled state indicating signal from the command transmitter 105, which enables uninterrupted execution of the synchronous actions from the initial action, is hereinafter explained.

Figure 22:
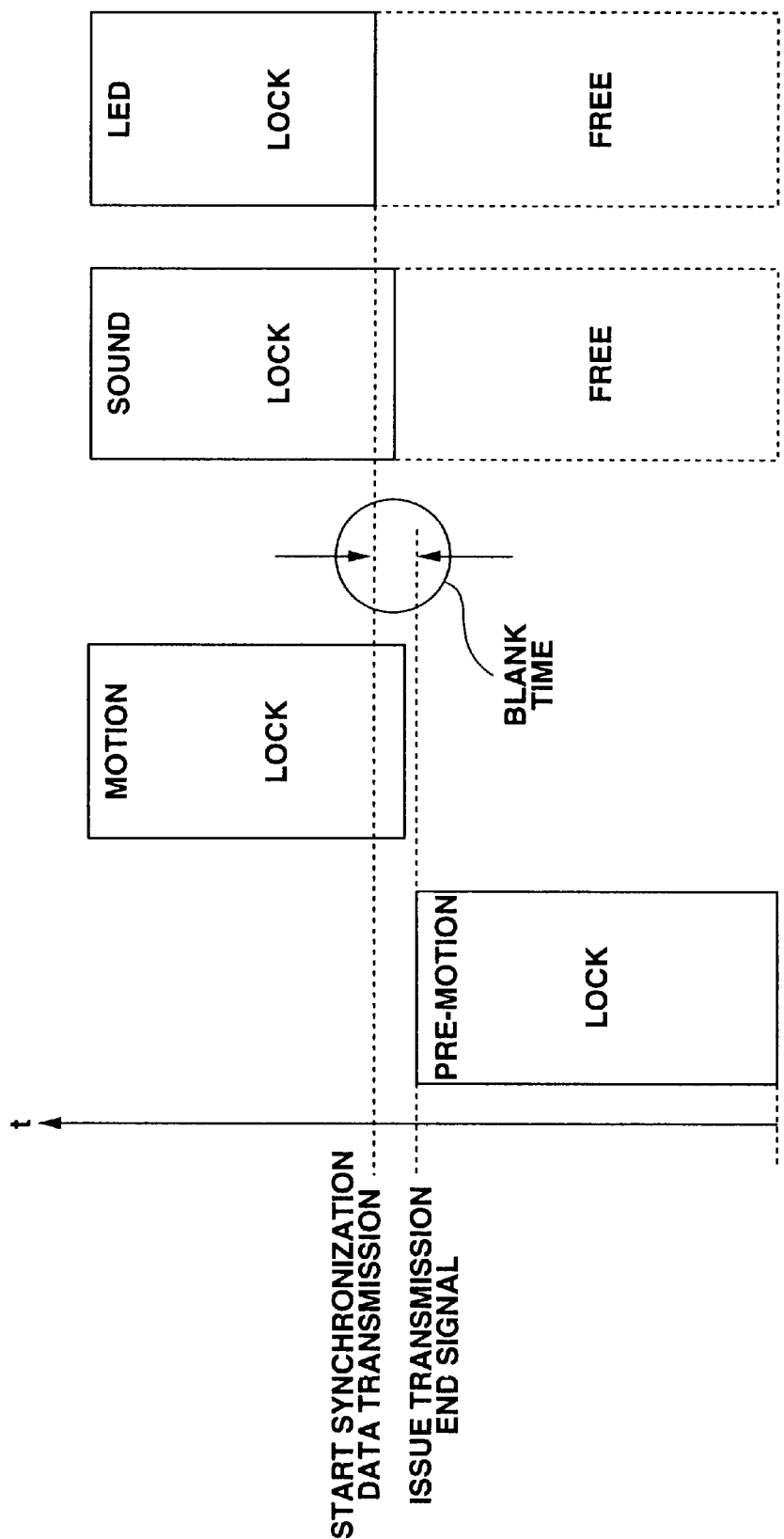
FIG. 22 is a schematic view for illustrating a case of commencing to output a synchronization command from a command controller by a transmission completion signal.
Figure 23:
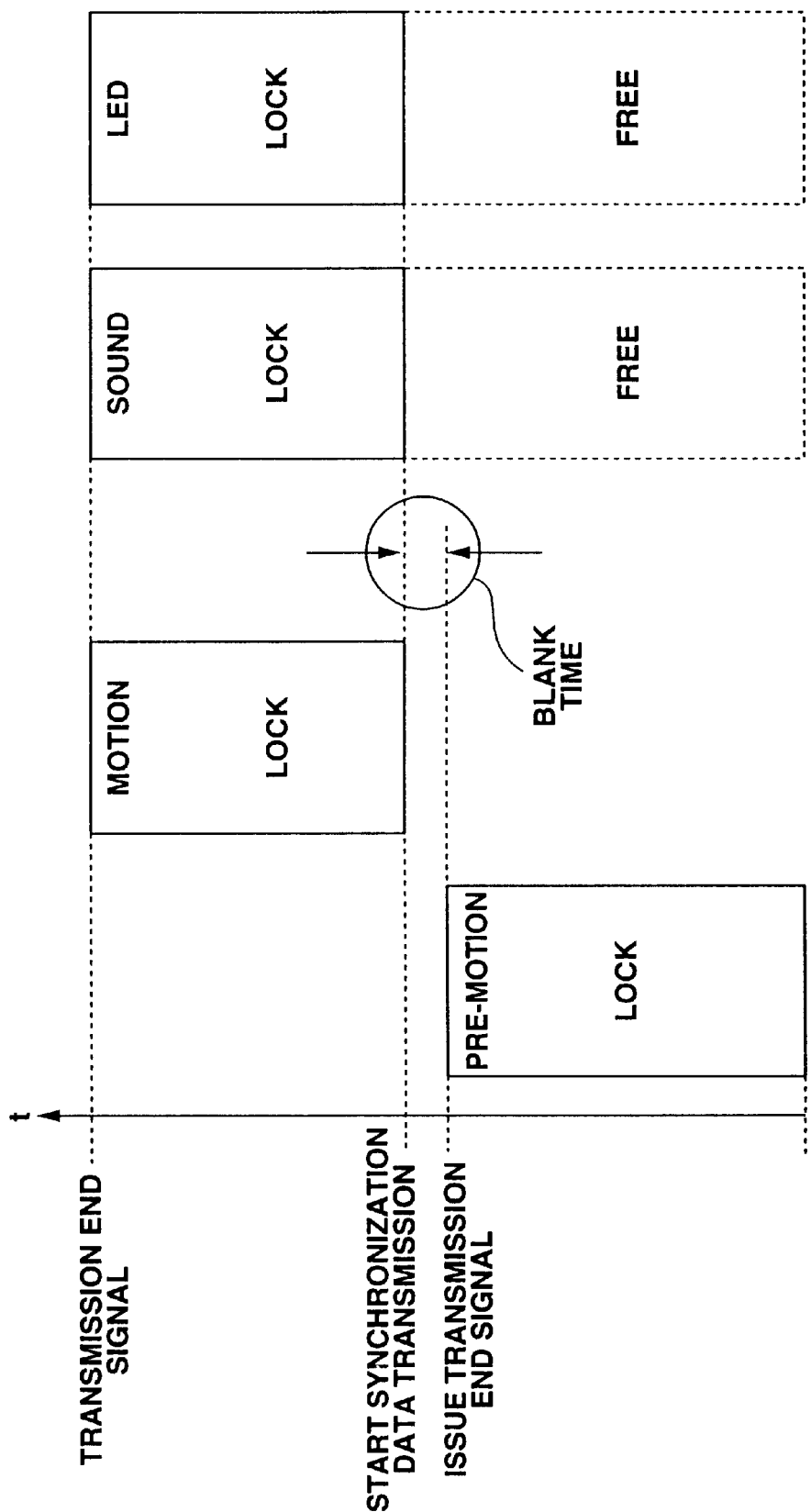
FIG. 23 is a schematic view for illustrating the timing in sending data from the command transmitter over data bus in case the synchronization command has commenced to be output from the command controller by the transmission completion signal.

For example, if, at a stage when the motor 109 is actuated and the initial action has come to a close, the command transmitter 105 has issued a transmission completion signal, indicating that effect, to the action management unit 102, the respective constituent elements, such as the action management unit 102 or the command controller 101, start the processing for synchronization actions, as from the time of issuance of the transmission completion signal. Thus, transmission of data (synchronization data) from the command transmitter 105 to the data bus 122 commences with a delay as from the issuance of the transmission completion signal, that is, with a delay as from the time of completion of the initial action, as shown in FIG. 22.

In such case, it would be favorable if the data strings from the management units 102 to 104 to the command transmitter 105 are input substantially simultaneously. However, there may be occasions where the data from the sound waveform management unit 104 is input with delay. Since the command transmitter 105 does not commences the transmission of data to the downstream side controllers 106 to 108 until the sum total of the pointers is equal to 100, the command transmitter 105 withholds from transmitting data to the controllers 106 to 108 over the data bus 122 for a time until the data is input from the sound waveform management unit 104 at the maximum. This produces the void time in the action of the robot apparatus 1 corresponding to this transmission withholding time.

Figure 24:
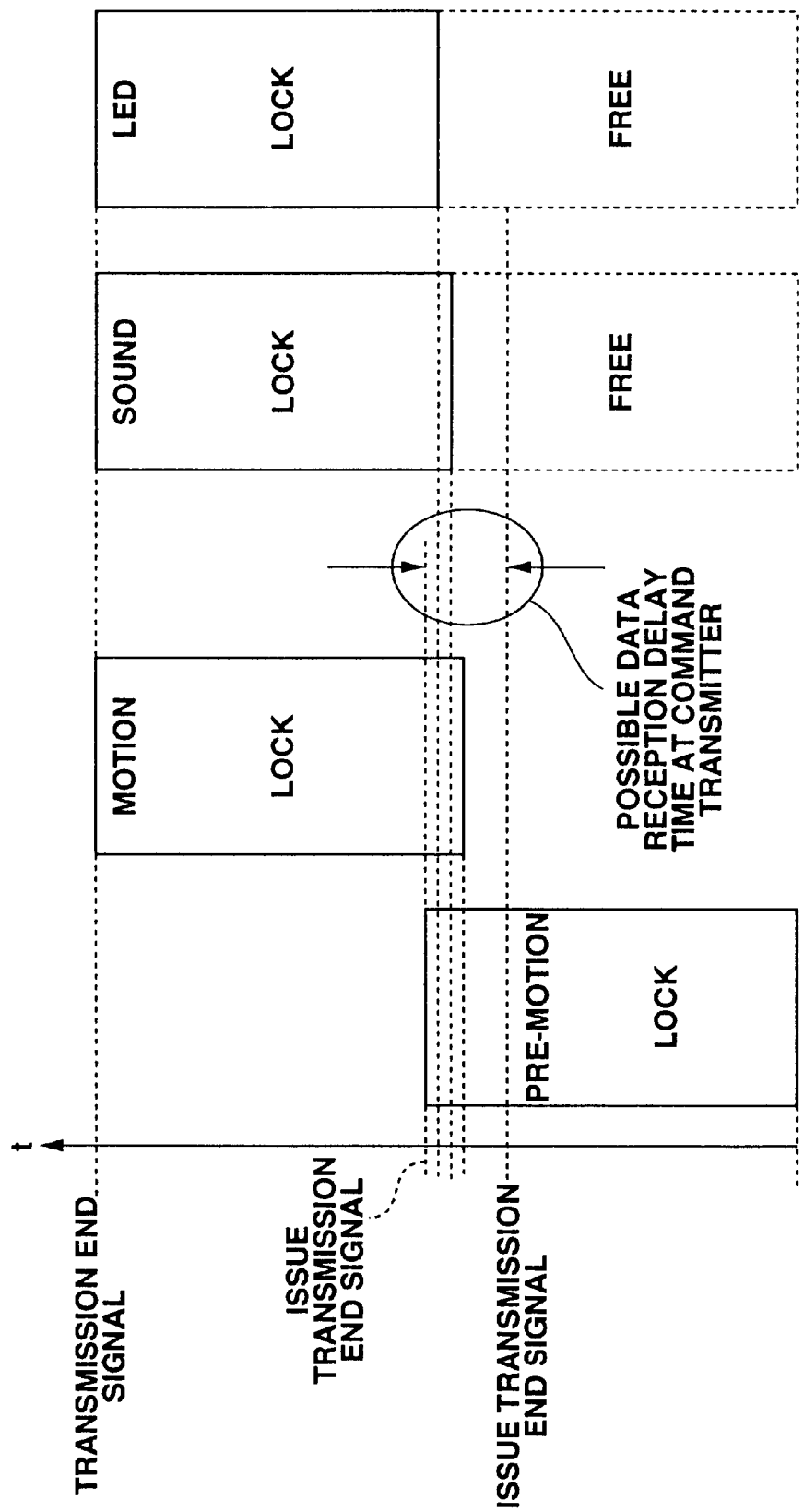
FIG. 24 illustrates a case of commencing to output a synchronization command from the command controller by issuance of a transmission enabled state indicating signal.

In this consideration, a transmission enabled state indicating signal is issued from the command transmitter 105 to the action management unit 102, and the timing of issuance of the transmission enabled state indicating signal is determined as being the timing equal to the residual data corresponding to the anticipated data receipt delay at the command transmitter 105 as shown in FIG. 24.

That is, this timing is such timing which takes into account the delay in receipt of data for the synchronization action by the command transmitter 105 caused by the constituent elements of the action management unit 102 or the command control unit 101 commencing the processing for synchronization actions as from the issuing timing of the commands. For example, the information pertinent to the timing of the issuance of the transmission enabled state indicating signal is afforded to the synchronization preparation command used for executing the initial action. The command transmitter 105 transmits the transmission enabled state indicating signal based on the information on the issuing timing afforded to the synchronization preparation command.

This transmission enabled state indicating signal is output at the aforementioned preset timing from the command transmitter 105 to the upper-order action management unit 102, whereby the robot apparatus 1 is able to execute the synchronization action in succession without delay as from the end of the initial action.

Although it may be contemplated to transmit the transmission enabled state indicating signal from the command transmitter 105 with sufficient time allowance, the command transmitter 105 has to store the data transmitted from the management units 102 to 104 during the time corresponding to the time allowance, and hence the memory cannot be utilized efficiently. Consequently, it would be ideal if the transmission enabled state indicating signal is sent from the command transmitter 105 at a timing corresponding to the start of the synchronization action in direct succession to the initial action to thereby achieve the effective memory utilization.

Figure 25:
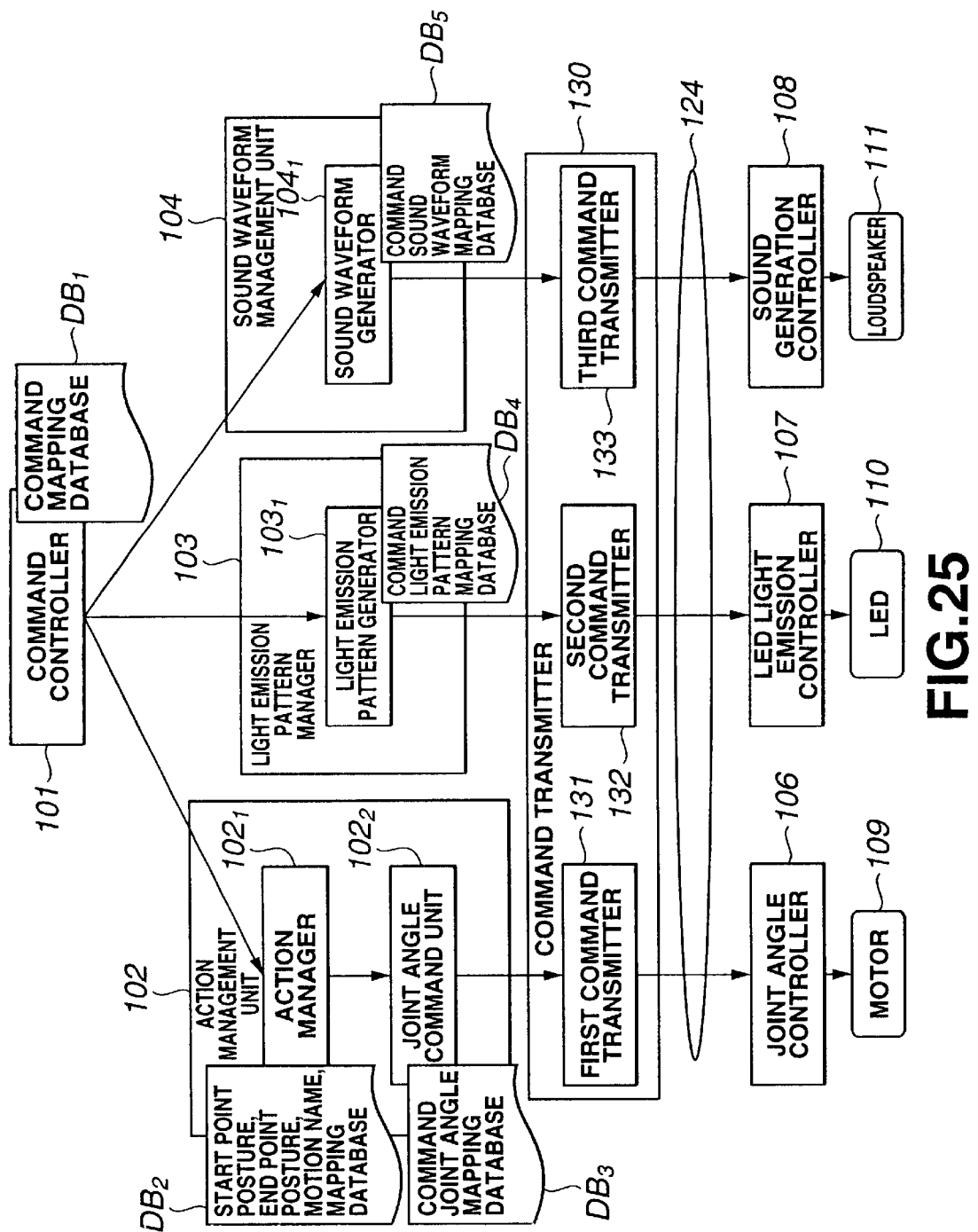
FIG. 25 is a block diagram showing a specified structure of the essential portions of the robot apparatus embodying the present invention and specifically showing a structure in which the command transmitter and respective controllers are separately interconnected over independent data buses.
Figure 26:
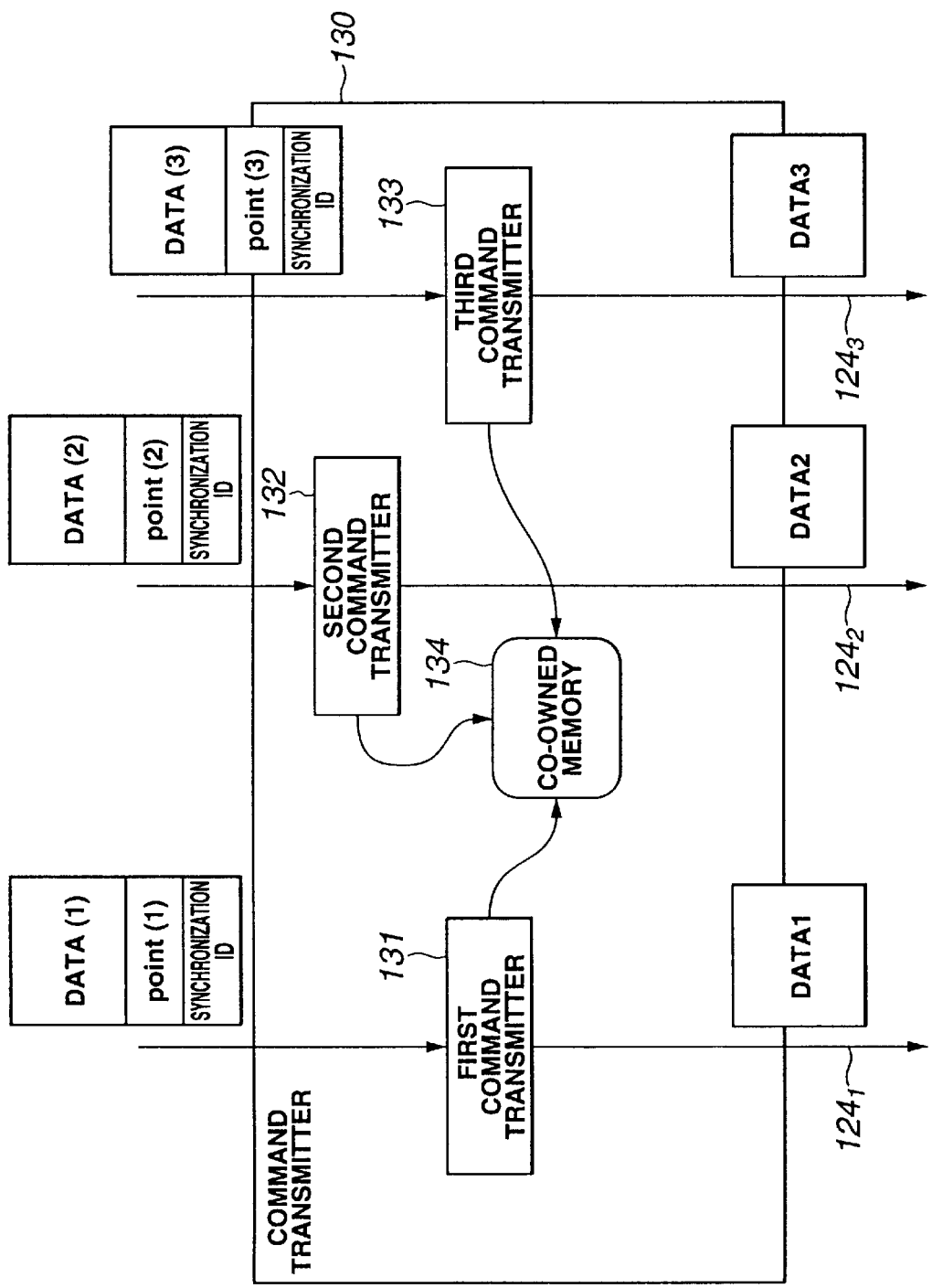
FIG. 26 shows the structure of the command transmitter as a constituent element of the essential portions of the robot apparatus.
Figure 27:
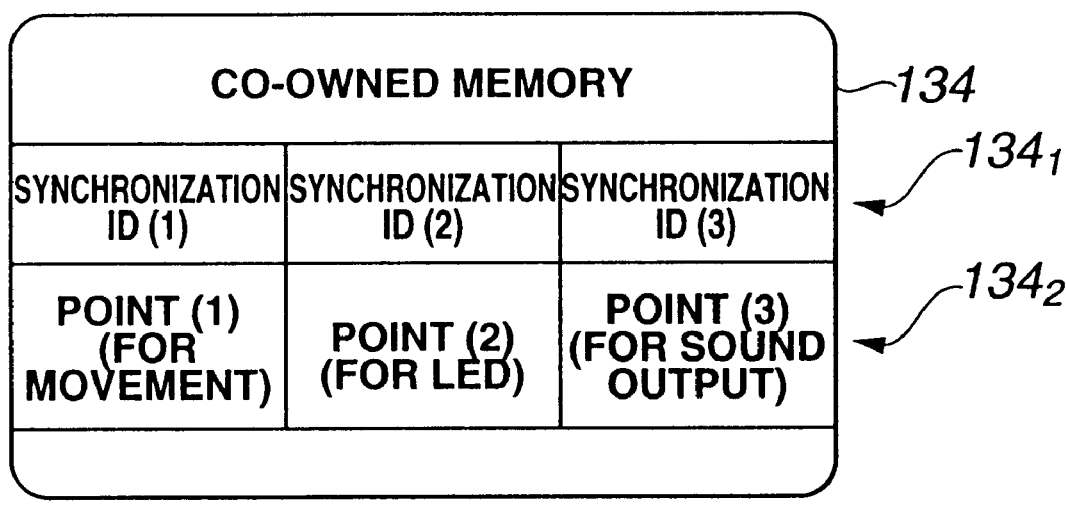
FIG. 27 is a diagrammatic view showing the structure of a memory as a constituent element of the essential portions of the robot apparatus.

In the above-described embodiment, as shown in FIG. 17, explanation has been made of a case wherein, in the structure of the robot apparatus 1, the command transmitter 105 and the respective controllers 106 to 108 are interconnected over the sole data bus 122. So, the command transmitter 105 is designed to adapt itself to such structure. This is, however, merely illustrative, such that, as shown in FIG. 25, the data bus may be formed by three data buses 124 independently interconnecting the command transmitter 130 to the respective controllers 106 to 108. In this case, the command transmitter 130 is designed as shown in FIGS. 25 and 26. The command transmitter 130 includes a co-owned memory 134, as shown in FIGS. 26 and 27.

In the so formed command transmitter 130, a first command transmitter unit 131 is fed with the synchronization ID, point values and the data string, output from the action management unit 102, a second command transmitter unit 132 is fed with the synchronization ID, point values and the data string, output from the light emitting pattern management unit 103 and a third command transmitter unit 131 is fed with the synchronization ID, point values and the data string, output from the sound waveform management unit 104.

The command transmitter units 131 to 133 cause the point values, afforded to the input data strings, to be stored in the co-owned memory 134. In the co-owned memory 134 are set a synchronization ID storage area $134_1$ for storage of the synchronization IDs and a point value storage area $134_2$ for storage of the point values, to enable the synchronization IDs and the point values to be stored therein in association with each other, as shown in FIG. 27. The co-owned memory 134 is co-owned by the command transmitter units 131 to 133 whereby the command transmitter units 131 to 133 are each able to refer to the synchronization IDs and the point values written by the other command transmitter units.

The first to third command transmitter units 131 to 133 monitor this co-owned memory 134 and, when the sum of the point values for the same synchronization ID is equal to 100, that is when the synchronization commands from all of the management units 102 to 104 have been entered to the command transmitter 130, the data strings are set at this timing on the associated data buses $124_1$, $124_2$ and $124_3$ and transmitted to the controllers 106 to 108, respectively.

The function of determining whether or not the sum total is equal to 100 may be built into the first command transmitter unit 131. In this case, when point values are stored in the synchronization ID storage area $134_1$ such that the sum total of the point values is equal to 100, the first command transmitter unit 131 notifies that effect to the second and third command transmitter units 132, 133. This enables the first to third command transmitter units 131 to 133 to set the data strings on the associated data buses $124_1$, $124_2$ and $124_3$ and to transmit the data strings to the controllers 106 to 108.

Figure 28:
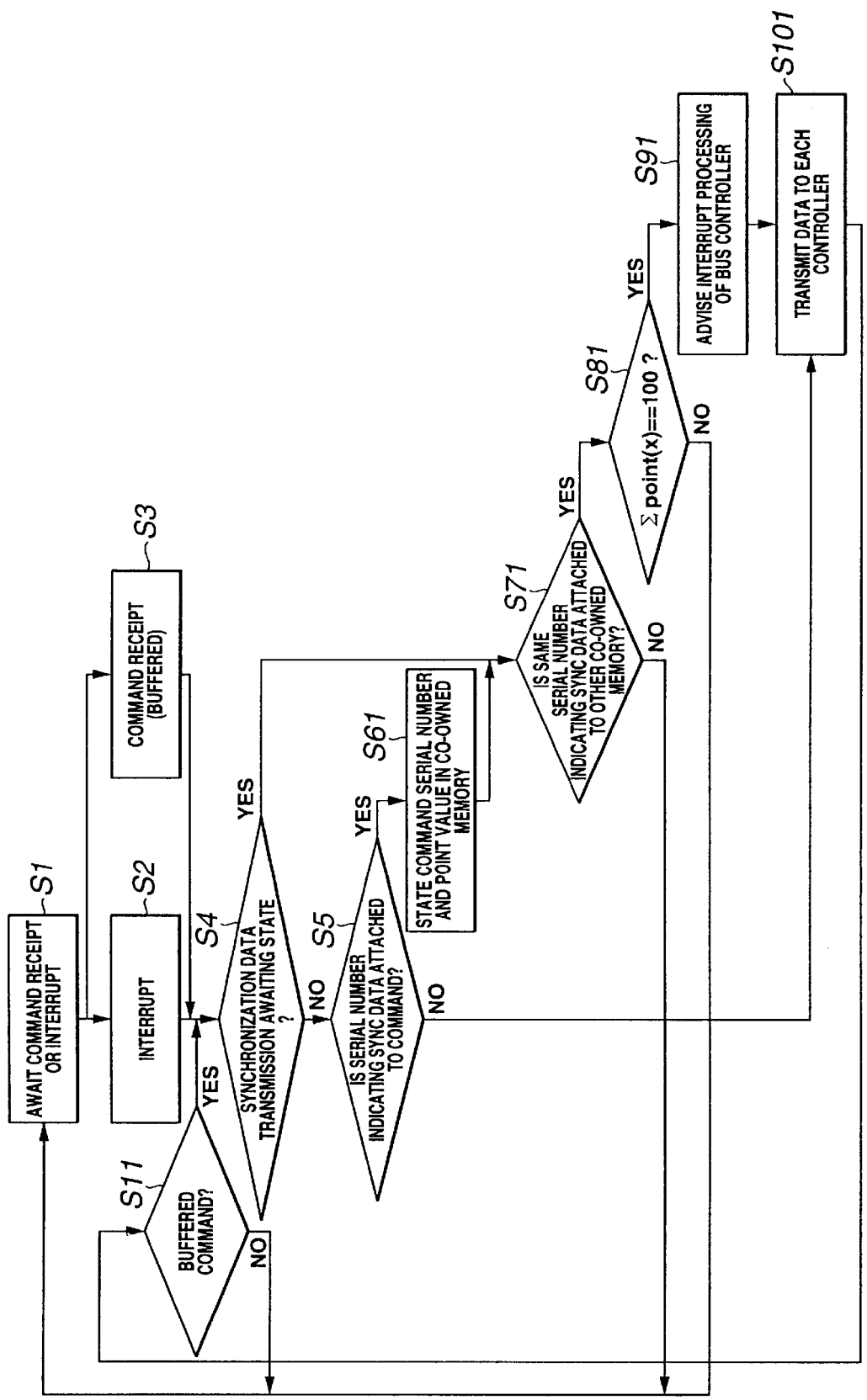
FIG. 28 is a flowchart showing the processing sequence in the structure of FIG. 25.

The above is the processing carried out in the command transmitter 130. FIG. 28 shows the flowchart for the processing flow in the command transmitter 130. Since the processing in this command transmitter 130 is associated with data transmission to the controllers 106 to 108 by exploiting plural data buses, the following explanation is centered about this portion. Meanwhile, the same processing is carried out at the steps bearing the same reference numerals in FIGS. 20 and 28, unless otherwise specified.

The command transmitter 130 includes the co-owned memory 134, that can be referenced by the first to third command transmitter units 131 to 133, as described above, so that, at step S61, the serial numbers and the point values, afforded to the commands, are stated in the co-owned memory 134.

The first to third command transmitter units 131 to 133 of the command transmitter 130 at step S71 checks whether or not the same serial numbers are afforded to the other areas of the co-owned memory 134. If the same serial number is afforded to the other areas, the first to third command transmitter units 131 to 133 proceed to step S81 and, if otherwise, the command transmitter units 131 to 133 revert to step S1.

The first to third command transmitter units 131 to 133 at step S81 check whether or not the sum of the point values (point (x)) afforded with the same serial numbers is equal to 100. If the sum total of the point values is equal to 100, the first to third command transmitter units 131 to 133 proceed to step S91 and, if otherwise, top step S1.

The first to third command transmitter units 131 to 133 at step S91 request permission for interrupt to the data buses $124_1$, $124_2$ and $124_3$ and associated with the bus controllers and, at step S101, start to transmit the data strings to the associated controllers 106 to 108 over the data buses $124_1$, $124_2$ and $124_3$.

The command transmitter 130, transmitting the data strings to the respective controllers, verifies, at step S11, whether or not there is any buffered command. If there is any buffered command, the command transmitter 130 proceeds to step S4 and, if otherwise, the command transmitter reverts to step S1.

The processing at the command transmitter 130 is executed in the manner described above. The controllers 106 to 108, fed with the data from the command transmitter 130 by this processing, control the motor 109, LED 110 and the loudspeaker 111 based on the input data. Since the controllers 106 to 108 control the motor 109, LED 110 and the loudspeaker 111 based on the data input at the synchronized timing, the movement by the motor 109, the light emission by the LED 109 and the sound output from the loudspeaker 111, as the actions performed on the actual robot apparatus 1, are synchronized with one another.

INDUSTRIAL APPLICABILITY

By application of the present invention, as described above, the robot apparatus is able to execute independent commands for the LEDs or loudspeakers that are freed with respect to the actions during the time the initial action is being carried out. Moreover, data strings of the contents of the synchronization commands are not sent out to the data bus during the time the initial action is being carried out, so that, if independent commands, for example, are produced, the synchronization commands may be erased extremely readily.

What is claimed is:

1. A robot apparatus comprising:
   a plurality of action means for performing actions; and
   control means for controlling the actions of the plural action means;
   said control means causing the plural action means to perform actions in synchronization with each other in succession to a preceding action performed by the action means;
   whereby said apparatus is selectively operable to either (i) issue a command for performing said preceding action prior to issuing commands for performing said actions in synchronization with each other, or (ii) issue a command for performing said preceding action at substantially the same time as issuing commands for performing said actions in synchronization with each other.

2. The robot apparatus according to claim 1 wherein, if there is a request for action interrupt, said control means causes the actions relevant to said request for action interrupt along with said preceding actions.

3. The robot apparatus according to claim 1 wherein transition between a plurality of posture states or action states is rendered possible; and
   wherein the preceding actions by said action means being the actions for transition to the posture or action state preparatory to the start of the temporally later actions.

4. The robot apparatus according to claim 1 wherein said control means causes the synchronized actions by the plural action means to be started based on the information relevant to anticipated termination of said preceding actions by said action means.

5. The robot apparatus according to claim 1 wherein said control means includes a command control unit for outputting an output command associated with an input command, a plurality of action control data conversion units operatively associated with said action means and adapted for outputting action control data associated with output commands output by said command controller, a data transmission control unit for controlling the transmission of each action control data output by each action control data conversion unit, and a plurality of action control units for controlling said action means based on the action control data output by said data transmission controller; and
   wherein said data transmission controller sending the action control data for synchronization, output by each action control data management unit, to each of said action control units in synchroneity.

6. The robot apparatus according to claim 5 wherein the synchronization information is afforded to each action control data for synchronization; and
   wherein said data transmission control unit sending the action data for synchronization to each of said action control units in synchroneity based on said afforded synchronization information.

7. The robot apparatus according to claim 6 wherein the synchronization information at least includes synchronization IDs and point values;
   wherein said point values being such numerical figures which on summation gives a preset value; and
   wherein said data transmission control unit sending the input action control data in synchroneity to each action control unit when the sum of the point values associated with the same synchronization ID afforded to the input action control data is equal to said preset value.

8. The robot apparatus according to claim 6 wherein if the output command is the synchronization command for synchronous actions, said command control unit commences outputting the synchronization command based on the information relevant to anticipated completion output by said data transmission control unit; and
   wherein said data transmission control unit outputting the information relevant to anticipated completion based on the anticipated completion time of the preceding actions.

9. The robot apparatus according to claim 1 wherein said plural action means are at least movement action means for performing the movement action, light emission means for performing the light emission and sound outputting means for outputting the sound.

10. A method for controlling the actions of a robot apparatus having a plurality of action means for performing actions; wherein
    the synchronous actions by the plural action means are carried out as temporally late actions in succession to a preceding action performed by the action means;
    whereby said apparatus is selectively operable to either (i) issue a command for performing said preceding action prior to issuing commands for performing said actions in synchronization with each other, or (ii) issue a command for performing said preceding action at substantially the same time as issuing commands for performing said actions in synchronization with each other.

11. The method for controlling the actions of a robot apparatus according to claim 10 wherein transition between a plurality of posture states or action states is rendered possible; and
    wherein the preceding actions by said action means being the actions for transition to the posture or action state preparatory to the start of the temporally later actions.

12. The method for controlling the actions of a robot apparatus according to claim 10 wherein the synchronization actions by the plural action means are started based on the information relevant to anticipated termination of preceding actions by said action means.

13. The method for controlling the actions of a robot apparatus according to claim 10 comprising:
    a command control step of outputting an output command associated with an input command;
    an action control data converting step of outputting action control data associated with an output command output at said command control step;
    a data transmission control step of controlling the transmission of each action control data output at said action control data converting step; and
    a plurality of action control steps for controlling said action means based on each action control data output at said data transmission control step;
    said data transmission control step sending action control data for synchronization, output at said control data conversion step, in synchroneity to each of said action control steps.

14. A robot apparatus comprising:
a plurality of action performing means for performing actions, and a plurality of action control means for controlling said action means; said robot apparatus further comprising:
  command control means for outputting a plurality of synchronization commands relevant to action performing commands for causing the robot apparatus to perform preset actions; and
  command transmission control means for controlling the synchronization commands output by said command control means to send the synchronization commands to said plural action control means;
  said command control means affording a label indicating at least the IDs of the synchronization commands to be synchronized and the total number of the synchronization commands to be synchronized to each of the plural synchronization commands to output said synchronization commands;
  said command transmission control means sending the plural synchronization commands in synchroneity based on said IDs and said total number.

15. A method for controlling the actions of a robot apparatus including a plurality of action performing means for performing actions, and a plurality of action control means for controlling said plural action means, said method comprising:
  a step of command control means affording a label indicating at least the IDs of the synchronization commands to be synchronized and the total number of the synchronization commands to be synchronized to each of plural synchronization commands relevant to action performing commands which cause the robot apparatus to perform preset actions; and
  a step of command transmission control means controlling the synchronization commands output by said command control means to cause the plural synchronization commands to be synchronized based on said IDs and said total number to send the synchronization commands to said plural action control means.

16. A robot apparatus comprising:
a plurality of action performing means for performing actions and a plurality of action control means for controlling the actions of the plural action performing means; said robot apparatus further comprising:
  command control means for outputting a plurality of synchronization commands relevant to action performing commands adapted for performing preset actions of said robot apparatus;
  a plurality of buses over which said action performing commands are transmitted;
  a plurality of command transmission control means provided for each of said buses for controlling said synchronization commands output by said command control means and for transmitting said synchronization commands to said plural action control means; and
  a co-owned memory that can be accessed by said plural command transmission control means;
  said command control means affording a label at least indicating the IDs of the synchronization commands to be synchronized and the total number of the synchronization commands to be synchronized to each of said plural synchronization commands and outputting the synchronization command;
  said command transmission control means causing the IDs and the total number to be stored in said co-owned memory and referencing said co-owned memory to synchronize the plural synchronization commands to send the synchronized synchronization commands to said action control means over said buses.

17. A method for controlling the actions of a robot apparatus including a plurality of action performing means for performing actions, and a plurality of action control means for controlling the actions of the plural action performing means, said method comprising:
  a step of command control means affording a label indicating at least the IDs of the synchronization commands to be synchronized and the total number of the synchronization commands to be synchronized to each of the plural synchronization commands relevant to action performing commands which cause the robot apparatus to perform preset actions; and a step of command transmission control means provided on each of plural buses, usable for transmitting said commands, controlling the synchronization commands output by said command control means to cause said IDs and the total number to be stored in said co-owned memory, and referencing said co-owned memory to synchronize said synchronization commands that can be accessed by said plural command transmission control means to transmit said synchronization commands to said plural command transmission control means over said buses.

* * * * *